(12) United States Patent
Nakajima

(10) Patent No.: US 10,696,596 B2
(45) Date of Patent: Jun. 30, 2020

(54) METHOD FOR PRODUCING DIELECTRIC CERAMIC, AND DIELECTRIC CERAMIC

(71) Applicant: Hitachi Metals, Ltd., Tokyo (JP)

(72) Inventor: Hirokazu Nakajima, Mishima-gun (JP)

(73) Assignee: HITACHI METALS, LTD., Tokyo (JP)

( * ) Notice: Subject to any disclaimer, the term of this patent is extended or adjusted under 35 U.S.C. 154(b) by 0 days.

(21) Appl. No.: 15/750,936

(22) PCT Filed: Dec. 21, 2016

(86) PCT No.: PCT/JP2016/088134
§ 371 (c)(1),
(2) Date: Feb. 7, 2018

(87) PCT Pub. No.: WO2017/115702
PCT Pub. Date: Jul. 6, 2017

(65) Prior Publication Data
US 2018/0222800 A1    Aug. 9, 2018

(30) Foreign Application Priority Data
Dec. 28, 2015  (JP) .................. 2015-256723

(51) Int. Cl.
*C04B 35/63* (2006.01)
*C04B 35/195* (2006.01)
(Continued)

(52) U.S. Cl.
CPC ............ *C04B 35/195* (2013.01); *B32B 18/00* (2013.01); *C04B 35/626* (2013.01);
(Continued)

(58) Field of Classification Search
CPC ............ C04B 35/195; C04B 35/62675; C04B 35/6261; C04B 35/626; C04B 2235/3481; C04B 2235/3206; C04B 2235/656
See application file for complete search history.

(56) References Cited

U.S. PATENT DOCUMENTS 6,676,743 B2 * 1/2004 Yamamuro ........... C04B 28/001
106/416
7,781,359 B2 * 8/2010 Yamakawa ........... C04B 35/465
264/614

(Continued)

FOREIGN PATENT DOCUMENTS

EP    0832859 A1    4/1998
EP    1612194 A1    1/2006
(Continued)

OTHER PUBLICATIONS

International Search Report for PCT/JP2016/088134 dated Apr. 4, 2017 [PCT/ISA/210].

(Continued)

*Primary Examiner* — Noah S Wiese
(74) *Attorney, Agent, or Firm* — Sughrue Mion, PLLC

(57) ABSTRACT

A method for producing a dielectric ceramic includes: shaping mixed powdery particles including a cordierite material ($2MgO \cdot 2Al_2O_3 \cdot 5SiO_2$) and a low-temperature-sintering material including Al, Si and Sr, the Si being partially vitrified; and firing the resultant shaped body. The method includes the step of wet-pulverizing the low-temperature-sintering material together with at least the cordierite material to prepare mixed powder particles having a median diameter D50 less than 1 μm; and, in a process until a time of the preparation of the mixed powder particles, the low-temperature-sintering material undergoes no step of wet- (Continued)

pulverizing only the low-temperature-sintering material, and drying the resultant pulverized material.

7 Claims, 13 Drawing Sheets

(51) Int. Cl.
  *H01B 3/12* (2006.01)
  *C04B 35/626* (2006.01)
  *B32B 18/00* (2006.01)

(52) U.S. Cl.
  CPC ...... *C04B 35/6261* (2013.01); *C04B 35/6263* (2013.01); *C04B 35/6264* (2013.01); *C04B 35/62655* (2013.01); *C04B 35/62675* (2013.01); *C04B 35/62685* (2013.01); *C04B 35/62695* (2013.01); *C04B 35/63* (2013.01); *C04B 35/6303* (2013.01); *H01B 3/12* (2013.01); *C04B 2235/3201* (2013.01); *C04B 2235/3206* (2013.01); *C04B 2235/3213* (2013.01); *C04B 2235/3217* (2013.01); *C04B 2235/3263* (2013.01); *C04B 2235/3281* (2013.01); *C04B 2235/3298* (2013.01); *C04B 2235/3418* (2013.01); *C04B 2235/3481* (2013.01); *C04B 2235/408* (2013.01); *C04B 2235/5409* (2013.01); *C04B 2235/5436* (2013.01); *C04B 2235/5445* (2013.01); *C04B 2235/5481* (2013.01); *C04B 2235/604* (2013.01); *C04B 2235/6025* (2013.01); *C04B 2235/656* (2013.01); *C04B 2235/6562* (2013.01); *C04B 2235/77* (2013.01); *C04B 2235/80* (2013.01); *C04B 2235/9615* (2013.01); *C04B 2237/341* (2013.01); *C04B 2237/62* (2013.01); *C04B 2237/66* (2013.01)

(56) References Cited

U.S. PATENT DOCUMENTS

| 2003/0150361 | A1* | 8/2003 | Yamamuro | C04B 28/001 |
| | | | | 106/677 |
| 2006/0100087 | A1 | 5/2006 | Fukuta et al. | |
| 2007/0100052 | A1* | 5/2007 | Terry Lee | C08L 91/00 |
| | | | | 524/451 |
| 2009/0011921 | A1 | 1/2009 | Arashi et al. | |
| 2009/0124482 | A1 | 5/2009 | Yamakawa et al. | |

FOREIGN PATENT DOCUMENTS

| JP | 06-345530 A | 12/1994 | | |
| JP | 2004-196652 A | 7/2004 | | |
| JP | 2006-290728 A | 10/2006 | | |
| JP | 2007-284290 A | 11/2007 | | |
| JP | 2010-006669 A | 1/2010 | | |
| JP | 2010006669 A | * | 1/2010 | ........... C04B 35/622 |

OTHER PUBLICATIONS

International Preliminary Report on Patentability with a Translation of Written Opinion issued from the International Bureau in counterpart International Application No. PCT/JP2016/088134, dated Jul. 12, 2018.

Communication dated Jun. 3, 2019 from the European Patent Office in application No. 16881677.5.

* cited by examiner

Example 3

Comparative Example 5

X1  Sheet width direction

METHOD FOR PRODUCING DIELECTRIC CERAMIC, AND DIELECTRIC CERAMIC

CROSS REFERENCE TO RELATED APPLICATIONS

This application is a National Stage of International Application No. PCT/JP2016/088134 filed Dec. 21, 2016 (claiming priority based on Japanese Patent Application No. 2015-256723 filed Dec. 28, 2015), the contents of which are incorporated herein by reference in their entirety.

TECHNICAL FIELD

The present invention relates to a method for producing a dielectric ceramic used in a ceramic substrate configured in an electric component in a microwave band, and a dielectric ceramic.

BACKGROUND ART

In recent years, semiconductor LSIs, chip components, and others have been increasingly made smaller in size and lower in stature, and the pitch between terminals has been increasingly made narrower. Ceramic substrates on which these members are to be mounted have also been required, for example, to be made smaller in size and lower in stature, and be made higher in precision. Hitherto, as a dielectric ceramic configured in a ceramic substrate, alumina has been mainly used. The firing temperature of alumina is as high as a temperature of 1300 to 1600° C.; thus, a high melting point metal such as W or Mo is used for the material of electrodes used in wiring lines, such as transmission line paths, on a ceramic substrate. However, W, Mo or the like is large in electric resistivity and in loss in a high-frequency range, so that the metal is not usable for components for which low-resistance wiring is required, or components for high frequencies. Thus, it has been desired to use a low-resistance metal such as Cu, Ag or Au. However, Cu, Ag, Au or the like is low in melting point, and thus a dielectric ceramic has been required to be capable of being sintered together with an electrode material at a low temperature of about 800 to 1000° C. Moreover, the dielectric constant of alumina is as large as about 10, so that in a transmission line path thereof, the transmission of high-frequency signals is delayed. In order to decrease the delay, dielectric ceramics have been desired which are relatively small in dielectric constant.

As a dielectric ceramic which is small in dielectric constant and can be sintered at low temperature, Patent Document 1 suggests an inorganic composition including at least one selected from alumina, cordierite, mullite and others, borosilicate based glass, and anorthite crystal. This dielectric ceramic is produced to include alumina in a proportion of 12 to 59.6% by mass of the whole of the ceramic, at least one selected from cordierite, mullite and others in a proportion of 10 to 30% by mass thereof, borosilicate based glass in a proportion of 18 to 69.6% by mass thereof and anorthite crystal in a proportion of 1 to 40% by mass thereof, where the whole of components be 100% by mass. However, the inorganic composition may cause, in a producing process thereof, for example, inconveniences that a B (boron) compound included in borosilicate based glass damages firing-furnace material, and that in the process of producing the inorganic composition into a ceramic sheet, the B compound is dissolved in water or alcohol and this compound segregates when the resultant workpiece is dried.

As a method for yielding a dielectric ceramic made dense at 900° C. without using borosilicate based glass, Patent Document 2 suggests a method of: calcining a raw material powder including oxides of Al, Si, Sr, Bi, Na, K, Cu and Mn to cause these oxides to react with each other to vitrify the oxides partially; pulverizing the resultant into fine particles of about 1 μm size; making the resultant powder into a low-temperature-sintering material; mixing this low-temperature-sintering material with cordierite or some other inorganic filler material that has been pulverized into fine particles of about 1 μm size at a prescribed ratio; shaping the mixture; and then firing the shaped body.

PRIOR ART DOCUMENTS

Patent Documents

Patent Document 1: JP-A-06-345530
Patent Document 2: JP-A-2010-6669

SUMMARY OF THE INVENTION

Problems to be Solved by the Invention

However, Patent Document 2 neither states whether or not the shaped body can be fired at a temperature lower than 900° C., nor states dielectric characteristics thereof. Moreover, in the case of mixing the finely pulverized materials with each other and firing the mixture, pores are generated in the firing by effects based on the aggregation of the particles and on others so that the fired body may not gain a sufficient denseness. Thus, the fired body may not easily gain the original dielectric properties thereof. Furthermore, this technique requires a production step of pulverizing each of the raw materials finely to have a problem of requiring time and costs corresponding to this production step.

Thus, an object of the present invention is to provide a method for producing a dielectric ceramic which can attain firing even at a low temperature lower than 900° C., has a wide range from which the firing temperature is selected, can decrease the porosity of the resultant to densify the microstructure thereof, and can decrease steps for the production to shorten the process period and decrease costs; and the dielectric ceramic.

Means for Solving the Problems

In order to solve the above-mentioned problems, the inventor has made eager investigations to find out that the object can be attained by adopting a process described below. Thus, the present invention has been achieved.

Accordingly, the method of the present invention for producing a dielectric ceramic is a method comprising: shaping mixed powdery particles comprising a cordierite material ($2MgO.2Al_2O_3.5SiO_2$), and a low-temperature-sintering material comprising Al, Si and Sr, the Si being partially vitrified; and firing the resultant shaped body; wherein the method comprises the step of wet-pulverizing the low-temperature-sintering material together with at least the cordierite material to prepare mixed powder particles having a median diameter D50 less than 1 μm; and wherein, in a process until a time of the preparation of the mixed powder particles, the low-temperature-sintering material undergoes no step of wet-pulverizing only the low-temperature-sintering material, and drying the resultant pulverized material. In the invention, various physical properties are values measured by methods adopted in the item EXAMPLES, and others. In the following description, a cordierite material may be called an A material; and a low-temperature-sintering material may be called a B material. Further, herein, sintering denotes a phenomenon that a material turns to a dense structural body, and the word "firing" is used for a conception including the meaning of sintering.

As described above, the present invention does not undergo any step of wet-pulverizing only a low-temperature-sintering material to be dried, but undergoes the step of wet-pulverizing the low-temperature-sintering material together with a cordierite material to prepare mixed powdery particles having a median diameter D50 less than 1 µm to enable to fire these materials at low temperature, decrease the resultant ceramic in porosity to densify the microstructure thereof, and further decrease steps for the production to shorten the process period and decrease costs. Furthermore, even when the firing is attained at a low temperature lower than 900° C., at the firing temperature the producing method of the invention gives desired dielectric characteristics more stably to the ceramic than conventional producing methods. Thus, a range from which the firing temperature is selected can be made wide, and further the A and B materials can be fired together with a low melting point metal while the desired dielectric characteristics are maintained.

It is preferred in the present invention that the resultant dielectric ceramic comprises, as a main phase thereof, Sr anorthite ($SrAl_2Si_2O_8$) and further comprises cordierite and alumina ($Al_2O_3$); and has a dielectric constant of 6.5 or less at a frequency of 15 GHz and a porosity of 0.8% or less. It is also preferred that the dielectric ceramic has an fQ product of 9 THz or more at a frequency of 15 GHz wherein f is the resonance frequency of the ceramic, and Q is the quality coefficient thereof.

In the present invention, the method preferably comprises the step of calcining raw materials to 850° C. or lower to yield the low-temperature-sintering material. When the raw materials are oxides or carbonates of Al, Si and Sr, the calcining thereof enables to separate $CO_2$ (de-carbonization) from the carbonates in the raw materials, and $SiO_2$ and others in the raw materials partially are made into vitrified low-temperature-sintering material. Without pulverizing the low-temperature-sintering material beforehand into fine particles, the low-temperature-sintering material is wet-pulverized in the state of being subjected to no treatment after calcining or cracked together with the cordierite material, whereby the pulverizing efficiency can be heightened to decrease the pulverizing period. In the wet-pulverization, the pulverization of the cordierite material is also advanced to make this material into fine particles. The resultant mixed powdery particles show a sharp particle size distribution, and further the particles do not aggregate (at particle diameters larger than the mode diameter, there is no maximum value in the distribution). Such a particle size distribution of the mixed powdery particles would make the dielectric ceramic after the firing dense.

It is preferred in the present invention that the firing is performed at 1000° C. or lower. This case enables to use a low resistance metal such as Cu, Ag or Au, and sinter the A and B materials together with these electrode materials to decrease the producing process and costs. Moreover, the low firing temperature enables to restrain the consumption of energy and prevent the firing furnace from being damaged. The fQ product of the resultant dielectric ceramic tends to become larger as the firing temperature is lower. Thus, the firing temperature is preferably 900° C. or lower, more preferably 800° C. or higher and lower than 900° C.

The low-temperature-sintering material in the present invention contributes to the matter that the firing temperature is made lower in the subsequent firing step. In the firing, the glass component in the low-temperature-sintering material turns into a liquid phase to be embedded in gaps between the particles of cordierite. Thus, the microstructure can be made denser. Furthermore, fractions of $Al_2O_3$, $SiO_2$ and SrO that are not vitrified react with each other so that the reaction product precipitates as Sr anorthite. Together with cordierite and Sr anorthite, the dielectric ceramic may contain each of MgO, SrO, $Al_2O_3$ and $SiO_2$ in a proportion excessive over the proportion thereof in the stoichiometric composition of cordierite or Sr anorthite, or a compound made from these oxides. When the raw materials undergo such a sintering step, the microstructure of the resultant dielectric ceramic can be made denser even when the sintering is at a low temperature (for example, 1000° C. or lower). The presence of Sr anorthite and cordierite can mainly attain target dielectric characteristics of a low dielectric constant and a high fQ product. Thus, the dielectric ceramic yield by the present producing method can be sintered in a wide temperature range, and can gain desired dielectric properties.

It is preferred in the present invention that a slurry is sheet-shaped into ceramic green sheets, the slurry comprising the mixed powder particles yielded by wet-pulverizing the cordierite material and the low-temperature-sintering material, and an organic solvent; and the ceramic green sheets are laminated onto each other to yield the shaped body. By firing this shaped body, the dielectric ceramic can be made low in porosity and dense in microstructure. Consequently, dielectric ceramics having desired dielectric characteristics can be produced with a good production efficiency.

It is preferred in the present invention that the resultant dielectric ceramic is a ceramic substrate. By the use of the dielectric ceramic, the microstructure of which has been densified, for a ceramic substrate, the substrate easily gains target dielectric characteristics, and mechanical strengths to be practical. This ceramic substrate can be sintered together with electrode material so that the producing steps and costs can be deceased.

It is preferred in the present invention that before the step of preparing the mixed powder particles, the cordierite material is pulverized to have a particle diameter D95 of 0.5 to 3.0 µm. In the firing, the glass component in the low-temperature-sintering material turns into a liquid phase, so that the microstructure is being densified in such a manner that the liquid is embedded in gaps between the particles of cordierite. When the particle diameter D95 of the cordierite material is within the range described just above, the cordierite material contains no coarse particle, and the densification of the microstructure is uniformly attained. Consequently, before and after the firing, a variation in the shrinkage factor (for example, a variation therein between sites inside a lot, or between lots) of the ceramic substrate can be decreased. This case is more advantageous for attaining the advantageous effects of the invention.

It is preferred in the present invention that in the step of preparing the mixed powder particles, the mixed powder particles comprise Ag. When the electrode material used for wiring lines is Ag, and the mixed powdery particles do not contain any Ag component, Ag in the electrode is easily diffused into the glass component in the ceramic green sheets at the firing time, so that the microstructure is easily made locally uneven, or the shrinkage factor is easily made uneven. It is presumed that this matter causes the ceramic substrate to be warped. As described above, however, in the mixed-powdery-particles preparing step, the incorporation of Ag into the raw materials restrains the diffusion of Ag into the glass component, so that the ceramic substrate can be restrained from being warped.

The dielectric ceramic of the present invention comprises, as a main phase thereof, Sr anorthite ($SrAl_2Si_2O_8$) and further comprises cordierite ($2MgO.2Al_2O_3.5SiO_2$) and alumina ($Al_2O_3$); and has a dielectric constant of 6.5 or less at a frequency of 15 GHz, and a porosity of 0.8% or less. The dielectric ceramic of the invention preferably has an fQ product of 9 THz or more at a frequency of 15 GHz.

The dielectric ceramic of the present invention is preferably a dielectric ceramic about which a variation in the shrinkage factor (%) of the ceramic is in a range of ±0.15% as a standard deviation 3σ when raw materials of the ceramic are fired. This case enables to decrease a variation in the shrinkage factor (for example, a variation therein between sites inside a lot, or between lots) of the ceramic substrate before and after the firing to densify the microstructure uniformly. This case is more advantageous for attaining the advantageous effects of the invention.

The dielectric ceramic of the present invention preferably comprises Ag in a proportion of 0.5 to 5% by mass, the proportion being in terms of the proportion of Ag in the composition of (the) raw materials of the ceramic. This case enables to restrain Ag from being diffused into the glass component at the firing time even when Ag is used as the electrode metal used for the wiring lines, so as to restrain the microstructure from being locally and unevenly densified. Consequently, the ceramic substrate can be restrained from being warped while maintaining a target low dielectric constant.

The dielectric ceramic of the present invention preferably comprises $Al_2O_3$ in a proportion of 20 to 25% by mass, $SiO_2$ in one of 50 to 60% by mass, $SrCO_3$ in one of 9 to 16% by mass, MgO in one of 3 to 6% by mass, $Bi_2O_3$ in one of 2 to 4% by mass, $Na_2CO_3$ in one of 1.5 to 5% by mass, $K_2CO_3$ in one of 0 to 1.0% by mass, CuO in one of 0.2 to 0.4% by mass, and $Mn_3O_4$ in one of 0.4 to 0.7% by mass, when the whole of $Al_2O_3$, $SiO_2$, $SrCO_3$, MgO, $Bi_2O_3$, $Na_2CO_3$, $K_2CO_3$, CuO, and $Mn_3O_4$ is 100% by mass, each of the proportions being in terms of the proportion of the corresponding oxide or carbonate in the composition of the raw materials.

MODE FOR CARRYING OUT THE INVENTION

Figure 1:
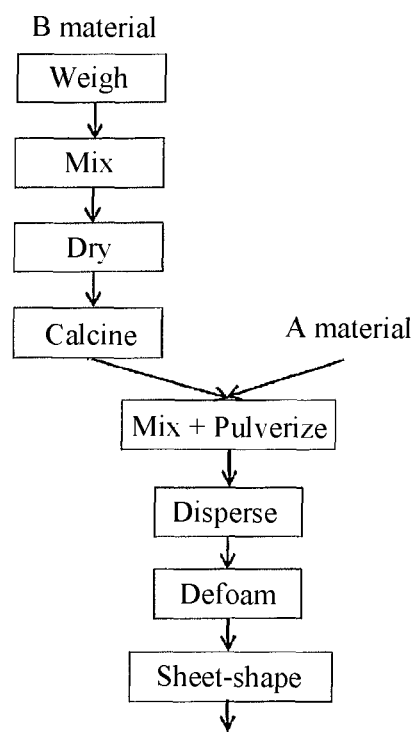
FIG. 1 is a flowchart of a process for producing a dielectric ceramic according to an example of the present invention.

Hereinafter, the method of the present invention for producing a dielectric ceramic will be described with reference to the drawings. However, in one or more of the drawings, or the whole thereof, parts or moieties unnecessary for the description are omitted, and the drawing(s) may be enlarged or reduced in scale to be illustrated in order to make the description easy. The term "upward and downward" or any other term showing a positional relationship is used merely to make the description easy, and never has an intention of restricting any constituent of the present invention.

<Method for Producing Dielectric Ceramic>

Hereinafter, the method of the present invention for producing a dielectric ceramic will be described. FIG. 1 is a flow chart of a process for producing a dielectric ceramic according to an example of the invention. As shown in FIG. 1, a low-temperature-sintering material (B material) is yielded by weighing raw materials, mixing the weighed materials with each other, drying the mixture, and calcining the resultant powder. A desired dielectric ceramic can be yielded by wet-pulverizing the low-temperature-sintering material (B material) and a cordierite material (A material) prepared in advance to prepare mixed powdery particles having desired particle diameters, dispersing a slurry including the resultant mixed powdery particles and an organic solvent, defoaming the slurry, shaping the slurry, and firing the shaped body. In a typical method of the present invention for producing a dielectric ceramic, a cordierite material and a low-temperature-sintering material including Al, Si and Sr, the Si being partially vitrified, are wet-pulverized until the median diameter D50 of the resultant turns to a value less than 1 μm. A plasticizer, a binder and others are added to the resultant mixed powdery particle slurry, and then stirring-dispersed therein. The resultant is vacuum-degassed to prepare a slurry adjusted to a predetermined viscosity. The slurry is shaped into the form of sheets. In this way, ceramic green sheets are produced. Some of the resultant ceramic green sheets are laminated onto each other to set the number of the laminated layers to a predetermined number. The laminate is compressed to produce a shaped body. The shaped body is fired at a temperature of 1000° C. or lower to succeed in preparing a dielectric ceramic. The low-temperature-sintering material can be yielded by calcining, for example, oxides or carbonates of Al, Si and Sr. The low-temperature-sintering material undergoes no step of wet-pulverizing and drying only the low-temperature-sintering material in a process until a time of the preparation of the material into the mixed powdery particles after the calcining thereof. The method enables to prevent particle-aggregation generated during the drying or some other operation, so that the microstructure of the resultant dielectric ceramic can be densified.

Figure 10:
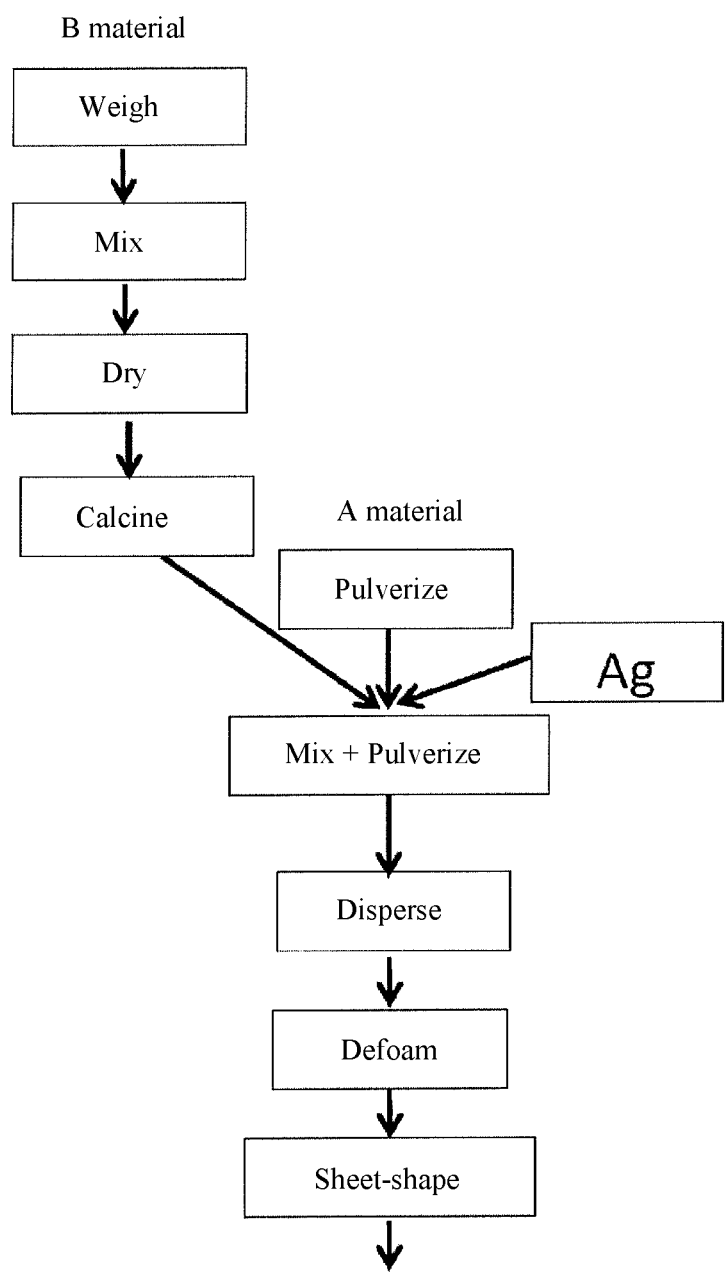
FIG. 10 is a flowchart of a process for producing a ceramic substrate according to still another example of the invention.

FIG. 10 is a flowchart of a producing process according to another example of the present invention for producing a dielectric ceramic. In FIG. 10, raw materials undergo the same process as in FIG. 1. However, the process in FIG. 10 is different from that in FIG. 1 in that before the mixing and pulverizing step of an A material and a B material, the cordierite material (A material) is pulverized and that in the mixing and pulverizing step of the A and B materials, Ag is added to the materials. In accordance with such a flowchart, the dielectric ceramic can be produced. In order to restrain the substrate from being warped while restraining a variation of the ceramic raw materials in shrinkage factor in the firing, the two are preferably added thereto. However, only one of the two may be added thereto in accordance with the purpose.

<Cordierite Material (A Material) and Producing Method Thereof>

The cordierite material in the present invention is typically cordierite, which is a silicate mineral represented by the composition of $2MgO.2Al_2O_3.5SiO_2$. The chemical composition thereof is a composition including 42 to 56% by mass of $SiO_2$, 30 to 45% by mass of $Al_2O_3$ and 12 to 16% by mass of MgO. The cordierite material may include any one of MgO, $Al_2O_3$ and $SiO_2$ in an excessive proportion relative to the proportion thereof in the stoichiometric composition of cordierite. Cordierite may contain any impurities (inevitable impurities) originating from the raw materials.

The cordierite material (A material) is not particularly limited. A natural product or synthetic product may be used therefor. A commercially available product produced by a known method may be used as it is. It is allowable to use a product yielded by subjecting a commercially available product to pulverization or any other operation into a median diameter D50 of 0.1 to 3 μm. In order to reduce the variation in shrinkage factor of ceramic substrate between before and after the firing, the cordierite material (A material) is pulverized into a median diameter D50 ranging preferably from 0.1 to 1.5 μm, more preferably from 0.5 to 1.5 μm. Moreover, the cordierite material may also be produced by blending raw powders including Si, Al and Mg, respectively, with each other, firing the blend to 1300 to 1400° C. by a known method, and then pulverizing the resultant to be made into fine particles. The pulverization may be attained in a wet manner or in a dry manner. A well-known and conventional pulverizing method is usable. The wet manner is desired since the dry manner easily causes components originating from the pulverizing means to be incorporated into the cordierite material. When the raw materials are pulverized in the wet manner, the resultant pulverized product may be used after the product is dried and subsequently made into powder, or may be used in the wet pulverization together with the low-temperature-sintering material while the pulverized product is kept in a slurry state.

In order to reduce the variation of ceramic substrate between before and after the firing, the cordierite (A material) is pulverized into a particle diameter D95 preferably from 0.5 to 3.0 μm, more preferably from 1.0 to 2.5 μm, even more preferably from 1.0 to 2.0 μm. When a finely pulverized product having a particle diameter in any one of these ranges is commercially available, the commercially available finely pulverized product is usable as it is.

In order to reduce the variation of ceramic substrate between before and after the firing, the cordierite material (A material) is preferably pulverized to have a particle diameter in any one of the above-mentioned ranges before the step of preparing the mixed powdery particles. In other words, it is preferred to pulverize the cordierite material (A material) in advance before the step of wet-pulverizing the low-temperature-sintering material together with at least cordierite material to be made into mixed powdery particles having a median diameter D50 less than 1 μm. Although the method for the pulverization may be a known pulverizing method, the materials are pulverized preferably in a wet manner from the viewpoint of the uniformity of the resultant. For example, it is preferred to charge the cordierite material and an organic solvent such as ethanol or butanol into a ball mill in which zirconia balls having a diameter of 5 mm are put, and then wet-pulverize the cordierite material for 10 to 30 hours to prepare a slurry. It is preferred from the viewpoint of the efficiency of the production to set the slurry concentration in the pulverization into the range of 20 to 50% by mass at the pulverizing time.

As described above, the pulverization of the cordierite material in advance enables that in the firing step, which will be detailed later, a variation of the ceramic substrate in shrinkage factor is decreased before and after the firing. The variation of the ceramic substrate in shrinkage factor before and after the firing is in a range preferably of ±0.50%, more preferably of ±0.30%, even more preferably of ±0.15%, as a standard deviation $3\sigma$.

The cordierite material has a median diameter D50 preferably from 1 to 3 μm, more preferably from 1 to 2.5 μm, even more preferably from 1 to 2 μm to densify the microstructure in the firing. In the document DESCRIPTION, the median diameter D50 of particles denotes the particle diameter thereof which corresponds to a 50% cumulative volume in a curve showing a relationship between the particle diameter and the cumulative volume (value obtained by accumulating the respective volumes of, out of the entire particles, ones having any specified particle diameter or less).

The purity of the cordierite material is preferably 95% or more, more preferably 97% or more in order that the dielectric ceramic can be improved in dielectric properties.

The BET specific surface area of the cordierite material is preferably from 3 to 10 m²/g in order that the material can be improved in dielectric properties when sintered.

The dielectric constant of cordierite in the present invention is preferably from 3 to 5 (at 15 GHz) in order that the dielectric ceramic can attain target dielectric properties. By the occupancy proportion of cordierite in the dielectric ceramic, the dielectric constant is also adjustable.

<Low-Temperature-Sintering Material and Producing Method Thereof>

The low-temperature-sintering material in the present invention is typically any one of the so-called LTCCs (low temperature co-fired ceramics), which can be sintered at a low temperature (for example, 1000° C. or lower), and includes Al, Si and Sr.

The low-temperature-sintering material can be yielded by using, as raw materials, oxides, carbonates or the like of Al, Si and Sr, and making use of calcining, which will be detailed later, to separate $CO_2$ from the carbonates of the raw materials (decarbonizing) and further to vitrify $SiO_2$ in the raw materials partially. In the raw materials, the distinction of the oxide species and the carbonate species from each other is not particularly limited. The low-temperature-sintering material may contain any impurity (inevitable impurity) originating from the raw materials.

When Al, Si and Sr are used as main components, it is preferred to set the Al content, the Si content, and the Sr content into the range of 10 to 20 parts by mass in terms of the amount of $Al_2O_3$, into that of 55 to 65 parts by mass in terms of the amount of $SiO_2$, and into that of 20 to 30 parts by mass in terms of the amount of $SrCO_3$, respectively, in 100 parts by mass of the total amount thereof in order that the raw materials can produce a sufficient sintering density and can be sintered at a low temperature of 1000° C. or lower.

The low-temperature-sintering material preferably includes, besides the main components, for example, one or more secondary components such as Bi, Na, K, Cu and/or Mn.

In order to make the glass low in softening point to permit the ceramic raw materials to be sintered at a lower temperature, the low-temperature-sintering material preferably include at least one from the group of Bi, Na and K in an amount of 10 parts or less by mass in the terms of the amount of $Bi_2O_3$, in one of 5 parts or less by mass in the terms of the amount of $Na_2O$, and in one of 5 parts or less by mass in the terms of the amount of $K_2O$, respectively, for 100 parts by mass of the main components.

Cu and Mn are preferably added to the low-temperature-sintering material to lower the crystal precipitating temperature of Sr anorthite. For this purpose, it is preferred that the material includes, as the secondary component(s), at least one of Cu or Mn in an amount of 5 parts or less in the terms of the amount of CuO, or in one of 5 parts or less in the terms of the amount of $MnO_2$ for 100 parts by mass of the main components.

The raw materials of the low-temperature-sintering material are each supplied in the form of, for example, an oxide or a carbonate, and these raw materials may be combined with each other at will as far as the above-mentioned individual ranges of the amounts of the main components and the secondary components are satisfied.

The raw materials of the low-temperature-sintering material in the present invention include neither PbO nor $B_2O_3$, which may be used in conventional LTCC substrates. PbO is a harmful substance; it takes costs to dispose of wastes thereof that are produced in the producing process; and further it is necessary to take care of the handling of PbO in the producing process. Moreover, $B_2O_3$ causes, for example, the following problems: the compound is dissolved in water or alcohol in the producing process, and segregated at the drying time; reacts with an electrode material at the sintering time; and reacts with a used organic binder to deteriorate the binder in performances. The low-temperature-sintering material does not contain such a harmful substance to be useful from the viewpoint of the environment.

The low-temperature-sintering material in the present invention is preferably yielded by weighing the individual raw materials, mixing the materials, drying the mixture to yield a powder, and then calcining the powder. The method for the mixing may be a known mixing method. It is preferred from the viewpoint of the uniformity of the mixture to charge the raw materials and ion exchange water into, e.g., a ball mill in which zirconia balls having a diameter of 5 mm are put, and then wet-mix these materials with each other for 10 to 30 hours to prepare a slurry. From the viewpoint of the production efficiency, the slurry concentration at the mixing time is preferably set into the range of 20 to 50% by mass.

It is preferred to charge, as the binder, 0.5 to 5 parts by mass of a water-soluble organic binder such as polyvinyl alcohol (PVA) into 100 parts by mass of the slurry described above. Thereafter, a known drying method is usable. For example, a spray drier is used to spray the slurry at a drying temperature of 100 to 300° C. to be dried, thereby yielding granules having a diameter of about 50 to 100 µm, in which the raw materials are mixed with each other.

The granules of the raw materials, which have been yielded by the drying, are shifted to a firing setter with a flange, and then calcined. In this way, a calcined low-temperature-sintering material can be produced. For the calcining, a known firing method may be used. For example, it is preferred to fire the granules in a firing furnace in the atmospheric air at a temperature-raising rate of 100 to 300° C./hour, and keep the workpiece at a temperature of 850° C. or lower for 1 to 3 hours. The calcining temperature is more preferably from 750 to 850° C.

When the raw materials include carbonates such as $SrCO_3$, $Na_2O_3$, and $K_2CO_3$, the individual carbonates are thermally decomposed to oxides such as SrO, $Na_2O$ and $K_2O$ by the calcining. Moreover, the amount of $SiO_2$ is partially vitrified. When the low-temperature-sintering material is analyzed by X-ray diffraction, the peak intensity of $Al_2O_3$ does not depend on the calcining temperature; however, the amount of $SiO_2$ is partially vitrified so that the peak intensity thereof is lowered with a rise in the calcining temperature. On the basis of the peak intensity of $SiO_2$, which shows the degree of the vitrification, the calcining temperature is decided. Moreover, by X-ray diffraction, it has been verified that Sr anorthite is not produced at temperatures of 850° C. or lower. When the low-temperature-sintering material contains Sr anorthite, the pulverization of this material is not easily advanced by the wet pulverization thereof together with cordierite, and further in the firing after the mixed powdery particles are shaped, the shaped body may be hindered from being densified. Thus, the calcining temperature, at which the low-temperature-sintering material is yielded, ranges preferably from 750 to 850° C., in which no Sr anorthite is produced, $CO_2$ is separated from the carbonates as the raw materials and the amount of Si is partially vitrified. Within this temperature range, relatively low temperatures are preferred since the low-temperature-sintering material is easily pulverized.

After calcining, the low-temperature-sintering material may be supplied, as it is, to the next wet-pulverizing step. However, when the material is turned to lumps not to be easily put into a pulverizing machine, the material may be disintegrated by a known method. The material may be disintegrated, using, for example, a grinder. In this case, the material may be disintegrated to have a median diameter D50 of 5 to 50 µm.

<Mixing and Pulverizing Step>

In the present invention, at least the cordierite material (A material) and the low-temperature-sintering material (B material) are wet-pulverized to yield mixed powdery particles. In the mixing and pulverizing step, the pulverizing machine is not particularly limited as far as the machine can give powdery particles having a median diameter D50 less than 1 µm. A machine suitable for the wet pulverization is preferably a ball mill. Mixed powdery particles having desired particle diameters can be yielded, for example, by charging the low-temperature-sintering material (B material) and cordierite material (A material) together with an organic solvent, such as ethanol or butanol, into a ball mill in which zirconia balls having a diameter of 5 mm are put, and wet-pulverizing the materials for 15 to 20 hours. At this time, the concentration in the slurry is preferably from 20 to 50% by mass. In order to reduce the variation of the ceramic substrate between before and after the firing, mixed powdery particles having desired particle diameter can be yielded in the following way when the cordierite material is beforehand wet-pulverized (in, for example, a ball mill): the manner of wet-pulverizing cordierite initially under conditions as described above, using the same wet-pulverizing machine as it is, charging the low-temperature-sintering material (B material) additionally to this machine, and continuing the wet pulverization under conditions as described above. It is preferred that in this way, only the A material is initially wet-pulverized in advance since the way enables to disperse the A and B materials more highly than the way of mixing the A and B materials with each other and wet-pulverizing the mixture, so that the former way can improve the efficiency of the pulverization. In order that the microstructure can be densified when the A and B materials will be sintered, the pulverization is performed until the median diameter D50 of the mixed powdery particles turns to a value less than 1 µm, preferably from 0.1 to 1.0 µm, more preferably from 0.1 to 0.8 µm, even more preferably from 0.3 to 0.6 µm. In the above-mentioned mixing and the pulverization, a dispersing agent and others may be appropriately used. In the present invention, the low-temperature-sintering material is pulverized together with the cordierite material in the mixing and the pulverization, thereby requiring no step of making the low-temperature-sintering material beforehand into fine particles. Consequently, steps for producing a dielectric ceramic can be decreased in number, so that the period for the steps can be shortened and costs can be decreased.

In order to restrain the substrate from being warped at the firing time, in the step of preparing the mixed powdery particles an electrode material (such as Ag, Cu or Au) used in wiring can be further incorporated into the mixed powdery particles. When the electrode material used for wiring is rendered, for example, Ag, it is preferred that the mixed powdery particles further contains Ag since Ag is low in resistance value and low in melting point. A metallic material in this case, such as Ag, is not particularly limited as far as the material is good in dispersibility in an organic solvent such as ethanol or butanol. A commercially available product produced by a known method may be used as it is.

The method for the incorporation of Ag is, for example, a method of adding Ag to the low-temperature-sintering material (B material), of adding Ag to the cordierite material (A material), or of wet-pulverizing the cordierite material (A material) and the low-temperature-sintering material (B material) to yield mixed powdery particles, and adding, at the time of this wet pulverization, Ag separately thereto. In order that the resultant dielectric ceramic can gain desired dielectric properties (such as desired dielectric constant, fQ product, and density), it is preferred to add Ag to the cordierite material (A material), or to wet-pulverize the cordierite material (A material) and the low-temperature-sintering material (B material) to yield mixed powdery particles and add, at the time of this wet pulverization, Ag separately thereto. In the case of pulverizing the cordierite material (A material) beforehand as described above, preferably, Ag may be added to the A material when this material is pulverized, or Ag may be added to the A and B materials when the B material is added to the A material after the A material is pulverized. In the case of adding Ag to the low-temperature-sintering material (B material), the addition of Ag before the calcining step causes metallic Ag to be changed to a Ag-containing compound by the calcining, or causes the generation of voids unknown about origins thereof, so that the resultant may be lowered in density. It is therefore preferred to add Ag to the calcinated body after the calcining step.

In the Ag addition, about the addition amount thereof, from the viewpoint of a restraint of a warp of the ceramic substrate, the addition is made to set the proportion of Ag into a range preferably from 0.5 to 5% by mass, more preferably from 0.8 to 4.5% by mass, even more preferably from 1.0 to 4.0% by mass, when the whole of the low-temperature-sintering material (B material), the cordierite material (A material), and added Ag is 100% by mass.

In order that the mixed powdery particles can be made dense in microstructure and improved in dielectric properties in the sintering, the BET specific surface area thereof is preferably from 10 to 20 $m^2/g$, more preferably from 12 to 16 $m^2/g$.

In the mixed powdery particles, preferably, the proportion of the cordierite material (A material) is from 20 to 35% by mass, when the whole of the low-temperature-sintering material (B material) and the cordierite material (A material) is 100% by mass, and that of the low-temperature-sintering material (B material) is from 65 to 80% by mass thereof. More preferably, the proportion of the cordierite material (A material) is from 27 to 33% by mass, and that of the low-temperature-sintering material (B material) is from 67 to 73% by mass of the whole of the low-temperature-sintering material (B material) and the cordierite material (A material). These ranges enable the resultant dielectric ceramic to gain target dielectric characteristics such as a target dielectric constant at a high frequency in a microwave band. Moreover, even if the firing is performed at a low temperature (for example, 900° C. or lower), the ranges favorably produce a good balance when glass in which the low-temperature-sintering material has been made into a liquid phase is being embedded in gaps between particles of cordierite.

In the method of the present invention for producing a dielectric ceramic, in a process from a time after the calcining of a low-temperature-sintering material to the preparation of mixed powdery particles, the low-temperature-sintering material singly does not undergo any wet-pulverizing step nor any drying step. This low-temperature-sintering material is wet-pulverized together with a cordierite material to prepare the mixed powdery particles. Consequently, the aggregation of the particles can be prevented. Thus, the resultant mixed powdery particles would show a sharp particle size distribution.

<Dispersing Step to Sheet-Shaping Step>

It is preferred to add an organic binder and a plasticizer into the slurry including the mixed powdery particles, which is yielded by the wet pulverization in the mixing and pulverizing step, to disperse the powdery particles. The organic binder is not particularly limited as the binder is a known and conventional organic binder. The binder is, for example, polyvinyl butyral (PVB) from the viewpoint of the strength, the hole-workability, the pressure bonding ability and the dimension stability of a ceramic green sheet yielded by sheet-shaping. The addition of the organic binder is made preferably in an amount of 5 to 25 parts by mass for 100 parts by mass of the slurry. The plasticizer is not particularly limited as far as the plasticizer is a known and conventional plasticizer. Examples thereof include butyl phthalyl butyl glycolate (BPBG), dibutyl phthalate (DBP), and dioctyl phthalate (DOP). The addition of the plasticizer is made preferably in an amount of 3 to 20 parts by mass for 100 parts by mass of the slurry. The solvent is preferably an organic solvent such as ethanol, butanol, toluene or isopropyl alcohol. By mixing these raw materials with each other in, e.g., a ball mill, the slurry can be dispersed. As required, a dispersing agent may be added to the slurry to improve the slurry in uniformity.

The slurry is vacuum-degassed to defoam the slurry to evaporate entrained air, the organic solvent and other volatile components. In this way, the slurry can be made into the state of a slurry adjusted to a predetermined concentration or viscosity. The adjusted viscosity is preferably from 8000 to 10000 cP.

Thereafter, a known sheet-forming technique, such as a doctor blade method, is used to shape the slurry-state mixed powdery particles into a ceramic green sheet having a thickness of 20 to 250 μm onto a carrier film. The shaping may be attained by, for example, the following besides the doctor blade method: a printing method, an inkjet painting method, or a transferring method. In the doctor blade method, the shaping speed, which is varied in accordance with the thickness of the ceramic green sheet to be obtained, is preferably from 0.1 to 1.0 m/min from the viewpoint of the uniformity of the sheet. When the thickness is a thickness (of, for example, 40 to 150 μm) of a ceramic green sheet in each of working examples, the speed is preferably from 0.2 to 0.75 m/min., more preferably from 0.2 to 0.5 m/min. The carrier film is preferably a resin film made of polyethylene terephthalate (PET), considering mechanical strengths, the surface smoothness and other factors thereof. The green sheet is cut, as it is, without being peeled from the carrier film to succeed in yielding plural ceramic green sheets. The following method is also a reasonable producing method: a method of repeating the take-up/let-off of the green sheet into a roll form without peeling the sheet from the carrier film nor cutting the sheet, and simultaneously supplying the resultant to a subsequent step, such as a printing step.

The slurry containing the organic solvent, which is yielded by the wet pulverization as described above, is sheet-shaped into ceramic green sheets, and these ceramic green sheets are laminated onto each other to succeed in yielding a shaped body. After the wet pulverization, the mixed powdery particles of the low-temperature-sintering material and cordierite can be sent into the green sheet forming step while keeping the slurry state. Also in the green sheet yielded by the sheet-forming, the aggregation of the particles is restrained. Thus, after the firing, the resultant dielectric ceramic would be a ceramic made dense by a decrease of pores.

The ceramic green sheet, which is supported on the resin film made of, e.g., PET is cut into a predetermined dimension, and the resultant sheets are peeled from the resin film. The ceramic green sheets are laminated onto each other, and then the laminate can be shaped by applying pressure onto the laminate in the laminating direction. In this step, the laminate is kept at a temperature at which the binder contained in the ceramic green sheets is softened, for example, a temperature of 30 to 90° C. for 100 seconds to 30 minutes in the state of applying a pressure of 1 to 30 MPa thereto, thereby producing a shaped body in which the ceramic green sheets have been pressure-bonded.

Thereafter, the shaped body is set on a porous alumina plate in order that gas generated by removal of the binder will be easily released. The removal of the binder, and firing can then be performed in a continuous furnace. In the firing, from about 200° C., at which the thermal decomposition of the binder is started, to about 600° C., at which the decomposition is completed, the temperature is initially raised desirably at a rate of 10 to 20° C. per hour in order to prevent a delamination of one or more of the ceramic green sheets, which is caused by pressure based on the generated gas. The removal of the binder may be attained in a nitrogen atmosphere. It is preferred to supply/discharge a sufficient volume of air to/from the firing system to promote the decomposition and oxidization of the organic binder, and promote the removal of generated decomposition gas or $CO_2$ gas. At 600° C. or higher, the proportion of the organic substance is at most about 0.05% by mass. Thus, for example, from 600° C., at a temperature-raising rate of 150 to 250° C. per hour, the shaped body is heated to 1000° C. or lower (for example, 900° C.) and then kept at the raised temperature for 1 to 3 hours to fire (sinter) the shaped body. In this way, a dielectric ceramic can be yielded. The fQ product of the resultant dielectric ceramic tends to be increased as the firing temperature is made lower. Thus, the firing temperature is set preferably to 900° C. or lower, more preferably to 800° C. or higher and lower than 900° C.

<Dielectric Ceramic>

The dielectric ceramic of the present invention is preferably a ceramic which is yielded by shaping mixed powdery particles including a cordierite material and a low-temperature-sintering material and then firing the shape body, and which includes, as a main phase, Sr anorthite ($SrAl_2Si_2O_8$) and further including cordierite and alumina ($Al_2O_3$). The dielectric ceramic of the invention is usable in a ceramic substrate on which semiconductor elements, inductances, or reactance elements such as capacitors are mounted, and further on which wiring lines connected to the semiconductor elements or the others are made of a low melting point metal such as Ag or Cu. Specifically, the dielectric ceramic is usable in an antenna or any other electric components that are used in a microwave band having a frequency of, e.g., 60 GHz.

The porosity of the resultant dielectric ceramic is preferably 0.8% or less, more preferably 0.75% or less, even more preferably 0.70% or less. In this case, the dielectric ceramic easily gains target dielectric properties.

The resultant dielectric ceramic preferably includes, for example, $Al_2O_3$ in a proportion of 20 to 25% by mass, $SiO_2$ in one of 50 to 60% by mass, $SrCO_3$ in one of 9 to 16% by mass, MgO in one of 3 to 6% by mass, $Bi_2O_3$ in one of 2 to 4% by mass, $Na_2CO_3$ in one of 1.5 to 5% by mass, $K_2CO_3$ in one of 0 to 1.0% by mass, CuO in one of 0.2 to 0.4% by mass, and $Mn_3O_4$ in one of 0.4 to 0.7% by mass, when the whole of $Al_2O_3$, $SiO_2$, $SrCO_3$, MgO, $Bi_2O_3$, $Na_2CO_3$, $K_2CO_3$, CuO, and $Mn_3O_4$ is 100% by mass, each of the proportions being in terms of the proportion of the corresponding component in the composition of the raw materials.

In order to restrain the ceramic substrate from being warped, the resultant dielectric ceramic further includes Ag in a proportion preferably from 0.5 to 5% by mass, more preferably from 0.8 to 4.5% by mass, even more preferably from 1.0 to 4.0% by mass of the same, each of the proportions being in terms of the proportion of the corresponding component in the composition of the raw materials.

The resultant dielectric ceramic preferably includes, for example, $Al_2O_3$ in a proportion of 20 to 25% by mass, $SiO_2$ in one of 50 to 60% by mass, $SrCO_3$ in one of 9 to 16% by mass, MgO in one of 3 to 6% by mass, $Bi_2O_3$ in one of 2 to 4% by mass, $Na_2CO_3$ in one of 1.5 to 5% by mass, $K_2CO_3$ in one of 0 to 1.0% by mass, CuO in one of 0.2 to 0.4% by mass, $Mn_3O_4$ in one of 0.4 to 0.7% by mass, and Ag in one of 0.5 to 5% by mass, when the whole of $Al_2O_3$, $SiO_2$, $SrCO_3$, MgO, $Bi_2O_3$, $Na_2CO_3$, $K_2CO_3$, CuO, and $Mn_3O_4$ is 100% by mass, each of the proportions being in terms of the proportion of the corresponding component in the composition of the raw materials.

In the dielectric ceramic, a variation of the ceramic substrate in shrinkage factor before and after the firing is in the range preferably of ±0.50%, as a standard deviation 3σ, more preferably of ±0.30%, even more preferably of ±0.15% to make the microstructure of the ceramic substrate uniform and dense.

The dielectric constant of the resultant dielectric ceramic is preferably 6.50 or less, more preferably from 5.50 to 6.50, even more preferably from 5.80 to 6.30 at a frequency of 15 GHz. This case enables that when semiconductors or others are mounted onto the ceramic, the resultant gains target electrical properties.

The fQ product of the resultant dielectric ceramic is preferably 9 THz or more, more preferably 9.5 THz or more at a frequency of 15 GHz.

The density of the resultant dielectric ceramic is preferably from $2.65 \times 10^3$ to $3.00 \times 10^3$ $kg/m^3$, more preferably from $2.73 \times 10^3$ to $3.00 \times 10^3$ $kg/m^3$ from the viewpoint of dielectric properties thereof.

The resultant dielectric ceramic preferably has a microstructure in which Sr anorthite is included as a main phase and respective phases of cordierite and $Al_2O_3$ are taken in the Sr anorthite phase. In short, the resultant dielectric ceramic is an anorthite-cordierite based dielectric ceramic. The dielectric ceramic has this structure and a decreased porosity, whereby the ceramic can gain a bending-resistant strength sufficient for being supplied to a ceramic substrate. The bending-resistant strength is a parameter which represents mechanical strength.

<Ceramic Substrate>

Figure 2:
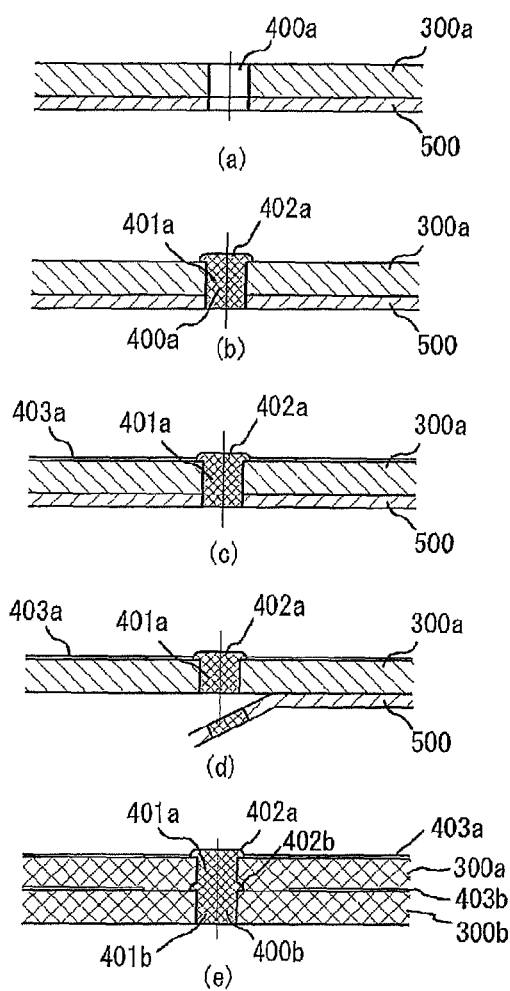
FIG. 2 are sectional views illustrating a process for producing a ceramic substrate according to another example of the invention.

The dielectric ceramic of the present invention is usable for a ceramic substrate. For example, a cordierite material (A material) and a low-temperature-sintering material (B material) are mixed and pulverized, and using the resultant mixed powder particles having a median diameter D50 less than 1 μm, a ceramic substrate can be produced on which wiring lines and others are formed, as illustrated in FIG. 2. FIG. 2 are sectional views illustrating a process, for producing a ceramic substrate, according to another example of the present invention.

As illustrated in FIG. 2(a), for example, a ceramic green sheet 300a, which has been shaped by a doctor blade method and not been subjected to any other treatment, is supported on a resin film 500 made of, for example, PET. In this state, via holes 400a can be made in the ceramic green sheet 300a. The via holes 400a may be made by a known method. The via holes can be made, for example, by punching the ceramic green sheet using a punching mold having plural punching pins, or by using laser working to perforate the sheet into a via hole form. The size of the via holes depends to the usage of the ceramic substrate. Preferably, the diameter thereof is, for example, from 30 to 80 μm.

Next, the ceramic green sheet 300a and a screen mask are set to a printer; and as illustrated in FIGS. 2(b) and 2(c), a squeegee is used to print and fill a conductor paste 402a into the via holes 400a made in the ceramic green sheet 300a, and further wiring lines 403a and others can be printed and formed thereon. The conductor paste 402a may be a known conductor paste. The paste may be, for example, a paste made of Ag or Cu from the viewpoint of the resistivity thereof.

As illustrated in FIGS. 2(d) and 2(e), the resin film 500 is peeled off from the ceramic green sheet 300a. This ceramic green sheet, and the same ceramic green sheets as described herein can be laminated onto each other. About the laminating of the ceramic green sheets, the resultant laminate can be made into a thickness of 0.2 to 1.5 mm by laminating 5 to 20 sheets of the ceramic green sheets onto each other, each of the sheets having a thickness of 10 to 200 μm. The number of the laminated layers (the lamination number) may be selected at will in accordance with a target thickness of the resultant ceramic substrate. A ceramic green sheet 300b of the above-mentioned laminated layers is fixed to a press machine through an adhesive sheet, and the ceramic green sheets 300b and 300b are located to put via wiring moieties 401a and 401b onto each other. Force is then applied to the workpiece along the vertical direction. In this step, it is preferred to keep the ceramic green sheets 300a and 300b at a temperature permitting the binder to be softened, for example, a temperature of 60 to 90° C. for 100 seconds to 30 minutes while a pressure of 1 to 30 MPa is applied to the sheets, so as to compress the ceramic green sheets 300a and 300b to produce a shaped body of the laminated layers. Preferably, the shaped body is further located into a mold composed of a metallic frame and a pair of metallic plates; and the resultant is sealed with a resin film, and then pressurized by CIP (cold isostatic pressing) to produce a shaped body.

Thereafter, the shaped body can be fired (in a sintering step). This firing can be attained, for example, in the atmosphere or a $N_2$ atmosphere at a temperature from 800 to 1000° C. for 30 minutes to 5 hours although these conditions depend onto the kind of the conductor paste. This process enables to yield a ceramic substrate which has ceramic layers laminated onto each other and made of a dielectric ceramic containing Sr anorthite, cordierite, $Al_2O_3$ and others, and which has thereon the wiring lines and others.

Using the dielectric ceramic of the present invention, semiconductor elements can be mounted on the resultant ceramic substrate, and wiring lines connected to the semiconductor elements can be arranged. Specifically, the dielectric ceramic is usable for an antenna or some other electronic component that is used in a microwave band having a frequency of, for example, 60 GHz. The resultant ceramic substrate has dielectric properties of the dielectric ceramic of the present invention, so that the substrate is small in loss in a high frequency band, and is practicable.

EXAMPLES

Hereinafter, the present invention will be described in detail by way of working examples thereof. However, the invention is not limited to the working examples, and may include other examples as far as the other examples do not depart from the subject matter of the invention. Initially, about various items evaluated in the working examples, measuring conditions and methods therefor are together described.

<Evaluations>

(1) Particle Size Distribution Measurement

The particle size distribution of particles was measured, using a laser diffraction type particle-size-distribution measuring instrument (LA-950 manufactured by HORIBA Ltd.). The transmittance of a used laser was set to 85%, and the period when ultrasonic waves are radiated is set to 5 minutes. The median diameters D10, D50, D90 and D95 of the particles are particle diameters corresponding to cumulative volumes of 10%, 50%, 90% and 95% in a curve showing a relationship between the particle diameter, and the cumulative volume (value obtained by accumulating the respective volumes of, out of the entire particles, ones having any specified particle diameter or less).

(2) Dielectric Constant, and fQ Product

Dielectric properties of a substance were evaluated by a dielectric resonator method (according to JIS R1627), using a network analyzer (8720D, manufactured by the Hewlett Packard Inc.). The resonance frequency f and the non-load Q value of a sample of the substance which has a predetermined shape (diameter: 11 mm, and thickness: 5.5 mm) were measured, and the fQ product was gained. Furthermore, from the dimension of the sample and the value "f", the dielectric constant of the sample was calculated out. The dimension was set to give a resonance frequency of 15 GHz. Moreover, the substance was subjected to thickness-working to give a resonance frequency of 60 GHz to produce another sample 10 mm×10 mm×0.3 mm in dimension. A network analyzer (N5227A manufactured by Agilent Technologies Japan, Ltd.) was used to evaluate dielectric characteristics of the sample by a cut-off circular waveguide method (according to JIS R1660-1).

(3) Porosity

A sectional surface of a columnar sample of a sintered body was mirror-polished, and the surface is observed through an optical microscope at a magnification of 100. Pore moieties and non-pore moieties of the resultant image were binarized into black and white moieties, respectively. An image analyzing software (Image J) was then used to calculate out the proportion of the area of the black moieties. Specifically, the measured area of the pore moieties was divided by the total area of the viewing field to calculate the resultant the quotient into the porosity (%) of the pores occupying the viewing field area.

(4) X-Ray Diffraction Intensity

A multifunctional X-ray diffraction machine MRD (manufactured by Spectris Co., Ltd.) was used to subject a sample to X-ray diffraction spectrometry, using Cu—Kα as a ray source.

(5) Density

The density of a sample was calculated from the outer diameter, the thickness and the mass of the sample.

(6) Specific Surface Area

The specific surface area of a sample was used by a BET method (gas adsorption method through an instrument, Macsorb, manufactured by Mountech Co., Ltd.).

(7) Shrinkage Factor and Variation in Shrinkage Factor

As will also be described in Examples 6 and 7, and Comparative Examples 7 and 8, an image analyzing machine (NEXIV VMZ-R3020) manufactured by Nikon Corp. was used to measure the distance X1 between marks on a ceramic substrate before the substrate is fired, and the distance X2 therebetween after the firing. Before and after the firing, the shrinkage factor of the ceramic substrate (shrinkage factor at the time of the firing) is calculated out (see a calculating equation described below). About a shrinkage factor variation in each of the examples, under the same conditions as described above, from the average of the respective shrinkage factors of 15 samples (n=15) and the standard deviation σ thereof, the standard deviation 3σ was calculated out. The resultant value was defined as the range of the variation.

The shrinkage factor of the ceramic substrate before and after the firing(shrinkage factor thereof at the firing time)=$(X1-X2)/X1 \times 100(\%)$ (8) Scanning Electron Microscopy (SEM)

Figure 12A:
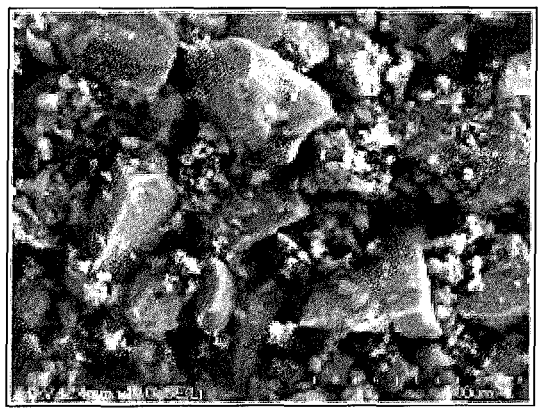
FIGS. 12(a) and 12(b) are photographs that show, respectively, an SEM image of the cordierite material (A material) in Example 6 of the invention, and an SEM image of that in Example 7 thereof.
Figure 12B:
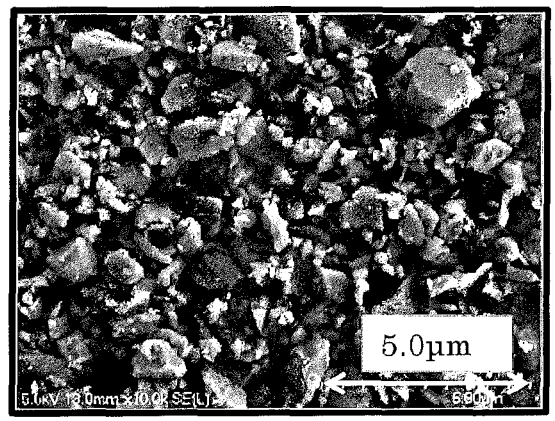

Through a scanning electron microscope (FEM-SEM, JSM-7800, manufactured by JEOL Co., Ltd.; magnification: 10000), a cordierite material (A material) was observed. FIGS. 12(a) and 12(b) show results obtained by measuring a sample. Although FIG. 12(a), any description on a scale thereof is omitted, FIGS. 12(a) and 12(b) are the same scale.

(9) Warpage Amount of Substrate

Figure 15A:
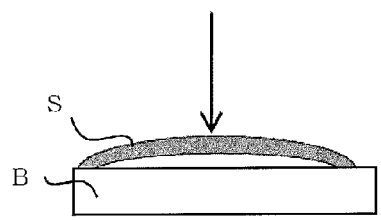
FIGS. 15(a) and 15(b) are schematic side views referred to for describing steps in a method for measuring the warpage amount of a substrate.
Figure 15B:
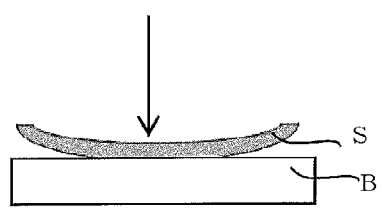

About each of Examples 8 to 17, the warpage amount of its substrate of 45 mm×45 mm size was calculated out. Specifically, as illustrated in FIG. 15(a), a fired substrate S is put on a horizontal measuring table B to be warped into an upward convex direction (i.e., to direct a surface of the substrate that has a Ag electrode layer onto the upper side of the substrate). A dial gauge was used to measure the height H (mm) of the substrate at its central point (just below a tip of an arrow in FIG. 15(a)) from each of four corners of the substrate. As illustrated in FIG. 15(b), next, the substrate S was turned upside down (to warp the fired substrate into a downward convex direction, or to direct the surface having the Ag electrode layer onto the lower side of the substrate), and then put onto the horizontal table. The same measuring instrument was used to measure the thickness T (mm) of the substrate at its central point (just below a tip of an arrow in FIG. 15(b)) from each of the four corners of the substrate. As represented by the following equation, the warpage amount (mm) of the substrate was calculated out as a value obtained by subtracting the thickness T (mm) of the substrate from the height H (mm) of the substrate:

Warpage amount (mm) of substrate=$H-T$

Example 1

In accordance with the flowchart in FIG. 1, a dielectric ceramic was produced.

(Preparation of Cordierite Material (A Material))

As an A material, the following was used: a commercially available cordierite material (composition: $2MgO \cdot 2Al_2O_3 \cdot 5SiO_2$; purity: 97.5%; median diameter D50: 1.65 μm, and BET: 6.3 $m^2/g$.

(Production of Low-Temperature-Sintering Material (B Material))

Raw materials as shown in Table 1 shown below were used as raw materials of a low-temperature-sintering material. These materials were weighed to have a composition shown in Table 2 and give a total weight of 50 kg.

TABLE 1

| Raw materials | Purity (%) | Median dimeter D50 (μm) | BET ($m^2/g$) |
|---|---|---|---|
| $Al_2O_3$ | 99.9 | 0.55 | 6.5 |
| $SiO_2$ | 95.4 | — | 41.5 |
| $SrCO_3$ | 99.5 | 0.42 | 7.50 |
| $Bi_2O_3$ | 99.2 | 0.83 | 2.38 |

TABLE 1-continued

| Raw materials | Purity (%) | Median dimeter D50 (μm) | BET (m²/g) |
|---|---|---|---|
| $K_2CO_3$ | 99.9 | — | 0.36 |
| $Na_2CO_3$ | 99.5 | — | 1.92 |
| CuO | 99.5 | 4.80 | 0.75 |
| $Mn_3O_4$ | 91.0 | — | 20.3 |

TABLE 2

| Main components (100 parts by mass) | | | Secondary components | | | | |
|---|---|---|---|---|---|---|---|
| $Al_2O_3$ (parts by mass) | $SiO_2$ (parts by mass) | $SrCO_3$ (parts by mass) | $Bi_2O_3$ (parts by mass) | $Na_2CO_3$ (parts by mass) | $K_2CO_3$ (parts by mass) | CuO (part by mass) | $Mn_3O_4$ (part by mass) |
| 16.6 | 59.8 | 23.6 | 3.7 | 5.1 | 1.1 | 0.4 | 0.7 |

Thereafter, the weighed raw materials and ion exchange water were charged into a ball mill of 200 L volume in which zirconia balls of 5 mm diameter were put, to adjust the concentration in the slurry to 35% by mass. The raw materials were wet-mixed for 22 hours to produce a slurry (50 kg/lot).

Into 100 parts by mass of the taken-out slurry was charged one part by mass of a binder (polyvinyl alcohol, PVA), and the resultant was spray-dried by a spray drier (atomizer rotating number: 10000 rpm, inject temperature: 280° C., outlet temperature: 125° C., and pump rotating number: 85 rpm) to produce granules having a median diameter D50 of 60 μm.

Figure 3:
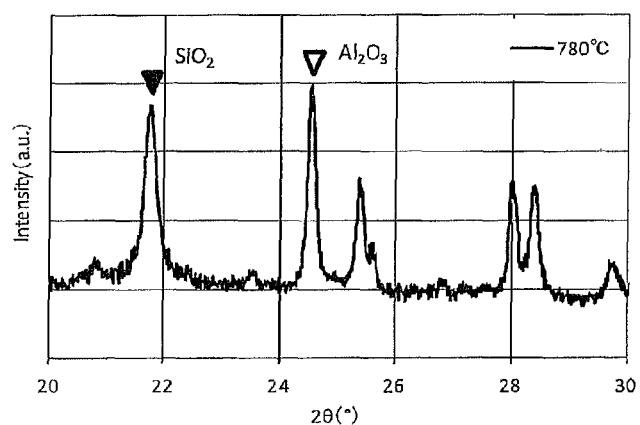
FIG. 3(a) is a chart showing an X-ray diffraction pattern of a low-temperature-sintering material calcined at 780° C. in the invention.
FIG. 3(b) is a relationship chart between the calcining temperature of a low-temperature-sintering material in the present invention, and the intensity of $SiO_2$ therein.
Figure 3:
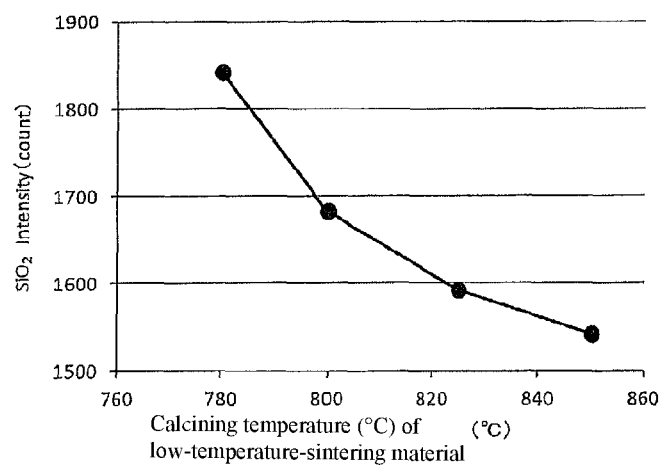

A fragment of the granules was put into a firing setter with a flange, and kept in a firing furnace at a temperature-raising rate of 200° C./hour in the atmosphere at each of temperatures of 780° C., 800° C., 825° C. and 850° C. for 2 hours to be calcined. In this way, low-temperature-sintering materials (B materials) different from each other in calcination temperature were produced. In FIG. 3(a) is shown an X-ray diffraction pattern of the low-temperature-sintering material calcined at 780° C. From FIG. 3(a), peaks showing the presence of $Al_2O_3$ and $SiO_2$ were verified but no production of Sr anorthite was verified. At the other calcining temperatures also, no Sr anorthite was produced. In FIG. 3(b) is shown a relationship between the calcining temperature of the low-temperature-sintering materials and the intensity of a peak at a $SiO_2$ diffraction angle of 21.7 degrees. It was verified that as the calcining temperature for the low-temperature-sintering materials is raised, the $SiO_2$ intensity is lowered. As the calcining temperature is lower, the resultant is more easily pulverized. After the operations described herein, the low-temperature-sintering material (B material) calcined at 800° C. was used to advance the production of dielectric ceramics.

(Production of Dielectric Ceramics)

Figure 8:
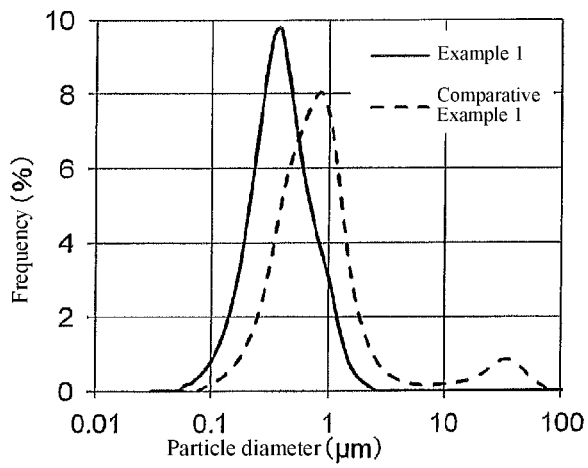
FIG. 8 is a chart showing the particle size distribution of mixed powdery particles in each of Example 1 of the invention, and Comparative Example 1.

The quantity of a fragment of the B material (low-temperature-sintering material) calcined at 800° C. was set to 70% by mass; and that of a fragment of the prepared A material, to 30% by mass. These were charged together with organic solvents ethanol and butanol into a ball mill of 100 L volume in which zirconia balls of 5 mm diameter were put, and the concentration in the slurry was adjusted into 37% by mass. These components were wet-pulverized and mixed with each other for 19 hours to produce mixed powdery particles (15 kg/lot). The pulverization was performed to set a target median diameter D50 to 0.4 μm. The particle size distribution of the mixed powdery particles is shown in FIG. 8. It was verified from FIG. 8 that Example 1 had a sharper particle size distribution than Comparative Example 1, which will be detailed later, to produce no aggregation. The median diameters D10, D50 and D90 of the resultant mixed powdery particles were 0.17 μm, 0.36 μm, and 0.83 μm, respectively.

The resultant slurry was dried to prepare mixed powdery particles. Into a mortar were charged the mixed powdery particles, and a binder (PVA) in an amount of 1 part by mass for 100 parts by mass of the mixed powdery particles, and these components were mixed with each other. The particles were passed through a sieve of 500 μm mesh to produce a granulated powder. Fragments of the powder were filled into individual molds to be shaped into columnar bodies. The resultant shaped bodies were kept at respective temperatures of 825° C., 850° C., 875° C., 900° C., 925° C. and 950° C. for 2 hours to be fired to yield individual dielectric ceramics each having a diameter of 11 mm and a thickness of 5.5 mm.

Comparative Example 1

Figure 9:
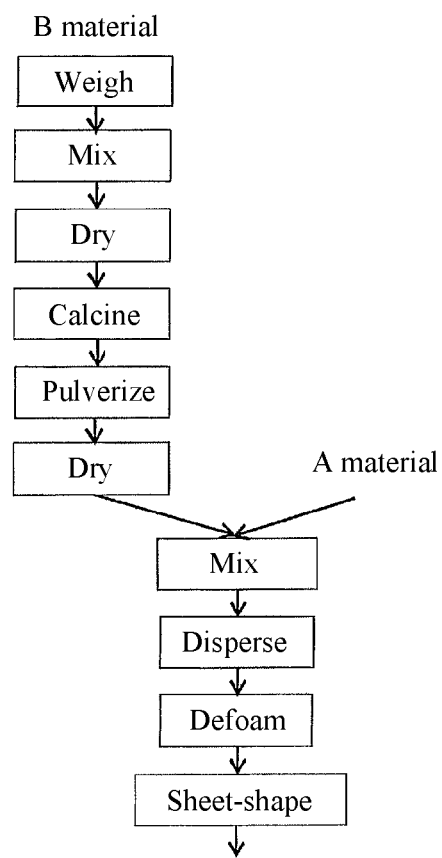
FIG. 9 is a flowchart of a producing process in the prior art for producing a dielectric ceramic.

A method for producing a dielectric ceramic of Comparative Example 1 is as shown in a flowchart in FIG. 9. Specifically, a low-temperature-sintering material (B material) is calcined at 800° C., passed through a pulverizing step and a drying step, and then mixed with a cordierite material (A material). In the same way as in Example 1 except that the pulverizing step and the drying step were added till a time when the mixed powdery particles were produced, dielectric ceramics were each produced.

The pulverization of the low-temperature-sintering material (B material) was performed by charging the low-temperature-sintering material (B material) together with ion exchange water into a ball mill of 100 L volume in which zirconia balls of 5 mm diameter were put, adjusting the concentration in the slurry into 37% by mass, and then wet-pulverizing the material for 25 hours (20 kg/lot). At this time, the pulverization was performed until the median diameter D50 turned to 0.40 μm. A spray drier was used to spray-dry the resultant slurry. Thereafter, the proportion of a fragment of the low-temperature-sintering material (B material) was set to 70% by mass; and that of a fragment of the prepared cordierite material (A material), to 30% by mass. These components were charged together with organic solvents ethanol and butanol into a ball mill of 100 L volume in which zirconia balls of 5 mm diameter were put. The concentration in the slurry was adjusted to 37% by mass, and the components were mixed with each other for 6 hours to produce mixed powdery particles (15 kg/lot). For the pulverization of the low-temperature-sintering material (B material) into finer particles and the mixing of the B material with the cordierite material, 31 hours were required. In FIG. 8 is shown the particle size distribution of the resultant mixed powdery particles. It was verified that the distribution had a maximum value at a particle diameter near to a particle diameter of about 50 µm and larger than the mode diameter, so that aggregation was generated. The median diameters D10, D50, and D90 of the mixed powdery particles were 0.29 µm, 0.71 µm and 2.34 µm, respectively.

The resultant slurry was dried to be turned to mixed powdery particles. Into a mortar were charged the mixed powdery particles, and a binder (PVA) in an amount of 1 part by mass for 100 parts by mass of the mixed powdery particles. The particles were passed through a sieve of 500 µm mesh to produce a granulated powder. Fragments of the powder were filled into individual molds to be shaped into columnar bodies. The resultant shaped bodies were kept at respective temperatures of 850° C., 875° C., 900° C., 925° C. and 950° C. for 2 hours to be fired to yield individual dielectric ceramics each having a diameter of 11 mm and a thickness of 5.5 mm.

Comparative Example 2

In Comparative Example 2, dielectric ceramics were produced in the same way as in Comparative Example 1 except steps described below. The low-temperature-sintering material (B material) produced in Comparative Example 1 was dried to produce (cordierite-material-free) powdery particles made only of the B material. Into a mortar were charged the mixed powdery particles, and a binder (PVA) in an amount of 1 part by mass for 100 parts by mass of the mixed powdery particles. The particles were passed through a sieve of 500 µm mesh to produce a granulated powder. Fragments of the powder were filled into individual molds to be shaped into columnar bodies. The resultant shaped bodies were kept at respective temperatures of 825° C., 850° C., 875° C., and 900° C. for 2 hours to be fired to produce individual dielectric ceramics each having a diameter of 11 mm and a thickness of 5.5 mm.

Figure 4:
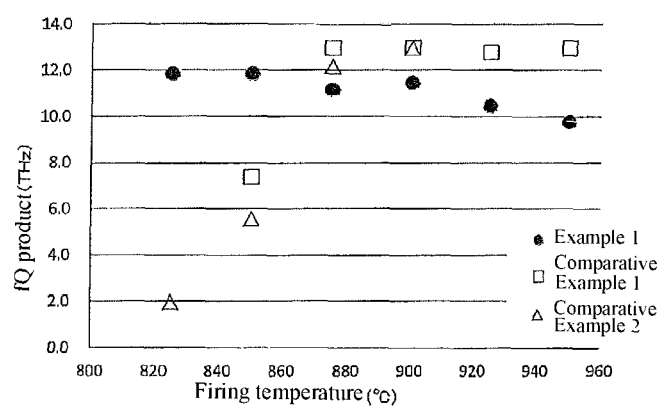
FIG. 4 is a graph showing a relationship between the firing temperature of ceramic raw materials and the fQ product of the resultant.
Figure 5:
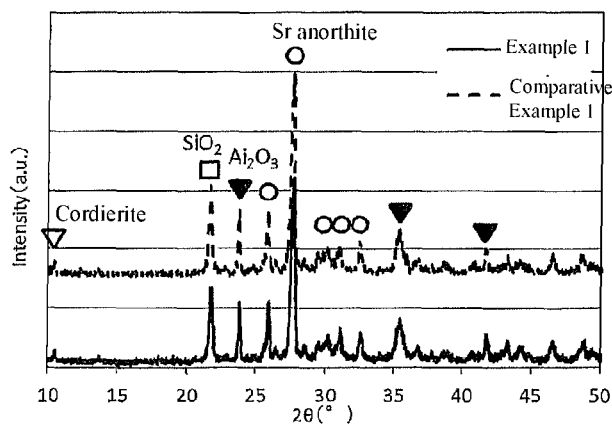
FIG. 5 is a chart showing an X-ray diffraction pattern of a dielectric ceramic of each of Example 1 and Comparative Example 1, in each of which firing is performed at 900° C.

About the resultant dielectric ceramics of Example 1 and Comparative Examples 1 and 2, the density, the dielectric constant and the fQ product thereof were evaluated. The results are shown in Table 3. In FIG. 4 is shown a relationship between the firing temperature and the fQ product. About dielectric characteristics (according to JIS R1660-1), at 60 GHz, of the sample fired at the firing temperature of 900° C. in Example 1, the dielectric constant was 6.13 and the fQ product was 43 THz. In Table 3 and FIG. 4, the dielectric properties are values thereof at a frequency of 15 GHz.

dielectric ceramics each contained Sr anorthite, cordierite, $Al_2O_3$, $SiO_2$, and others. A diffraction peak of the Sr anorthite made its appearance largely than other crystal phases; thus, it was verified that the main phase of the dielectric ceramics was Sr anorthite. The dielectric ceramics of Comparative Example 1 gained a stable dielectric constant of 6.5 or less and an fQ product of 9 THz or more at 15 GHz in a firing temperature from 875 to 950° C. while the fQ product was largely lowered and the dielectric constant was increased at the firing temperature of 850° C. (Table 3 and FIG. 4). Such a tendency was the same tendency as the dielectric ceramics of Comparative Example 2, which were made only of the low-temperature-sintering material (B material). In FIG. 5 are shown X-ray diffraction patterns of the dielectric ceramic fired at 900° C. in Example 1 and that in Comparative Example 1. In the same manner as in Example 1, in Comparative Example 1 the dielectric ceramic fired at 900° C. also contained Sr anorthite, cordierite, $Al_2O_3$, $SiO_2$ and others, and the main phase thereof was Sr anorthite. The porosity of each of the dielectric ceramics of Example 1 and Comparative Example 1 was evaluated. As a result, in Example 1, each of the ceramics had a porosity smaller than 0.8%. However, in Comparative Example 1, each of the ceramics had a porosity of 1 to 2%. It has been understood that the process in the present invention enables to give desired dielectric characteristics more stably at individual firing temperatures than conventional processes even when the firing is performed at low temperature. This would be because the matter that the microstructure is densified (the porosity is decreased) at the sintering time contributes to this advantage, as described above.

Example 2

In the same way as in Example 1 except the ratio by content between the low-temperature-sintering material (B material) and the cordierite material (A material), mixed powdery particles were yielded (72.5% by mass of the low-temperature-sintering material (B material) and 27.5% by mass of the cordierite material (A material)). A slurry of the mixed powdery particles was taken out. To 100 parts by mass of the slurry were initially added 7 parts by mass of a plasticizer (DOP), and then thereto were added 10 parts by mass of a binder (PVB). The materials were stirred and dispersed (at a rotating number of 270 rpm). Furthermore, the resultant was vacuum-degassed to be defoamed. In this way, entrained air, the organic solvent and other volatile

TABLE 3

| Firing temperature (° C.) | Example 1 | | | Comparative Example 1 | | | Comparative Example 2 | | |
|---|---|---|---|---|---|---|---|---|---|
| | Density ($\times 10^3$ kg/m$^3$) | Dielectric constant | fQ product (THz) | Density ($\times 10^3$ kg/m$^3$) | Dielectric constant | fQ product (THz) | Density ($\times 10^3$ kg/m$^3$) | Dielectric constant | fQ product (THz) |
| 825 | 2.79 | 6.14 | 11.9 | — | — | — | 2.80 | 6.36 | 2.0 |
| 850 | 2.79 | 6.16 | 11.9 | 2.77 | 6.11 | 7.4 | 2.80 | 6.09 | 5.6 |
| 875 | 2.79 | 6.16 | 11.2 | 2.76 | 6.04 | 13.0 | 2.80 | 6.04 | 12.2 |
| 900 | 2.78 | 6.14 | 11.5 | 2.76 | 6.04 | 13.0 | 2.74 | 5.88 | 13.0 |
| 925 | 2.78 | 6.13 | 10.5 | 2.76 | 6.03 | 12.8 | — | — | — |
| 950 | 2.78 | 6.13 | 9.8 | 2.76 | 6.04 | 13.0 | — | — | — |

The dielectric ceramics of Example 1 gained a stable dielectric constant of 6.5 or less and an fQ product of 9 THz or more at 15 GHz in the firing temperature range from 825 to 950° C. (Table 3 and FIG. 4). The dielectric ceramics were subjected to X-ray diffraction spectroscopy. As a result, the components were evaporated to make the resultant into a slurry state that the viscosity was adjusted to 8500 cP. A doctor blade method was used to shape the defoamed slurry into a ceramic green sheet having a shaping thickness of 150 µm at a shaping speed of 0.25 m/min.

The ceramic green sheet was caused to be supported onto a resin film made of PET. The resultant ceramic green sheet was peeled off from the resin film, and the sheet was punched out into the form of circles. Out of the resultant circular sheets, 35 ones were put onto each other, and the resultant was temporarily compressed by a press machine to produce a laminate. Thereafter, a pressure of 11 MPa was applied to the laminate at 85° C., at which the binder was to be softened. In this state, the laminate was kept for 30 minutes, and subjected to cold isostatic pressing (CIP) to produce a columnar shaped body.

Thereafter, the shaped body was fired in a firing furnace in the atmospheric air to produce a dielectric ceramic. In this firing, the temperature was raised at a rate of about 20° C. per hour up to 600° C. (degreasing step). From 600° C., the temperature was then raised at a rate of about 200° C. per hour. The shaped body was kept at 900° C. for 2 hours, and fired to yield a dielectric ceramic. The dielectric ceramic was subjected to X-ray diffraction spectroscopy. As a result, the dielectric ceramic contained Sr anorthite, cordierite, $Al_2O_3$, $SiO_2$, and others. In this case also, Sr anorthite was the main phase of the dielectric ceramic.

Examples 3 and 4

A dielectric ceramic of Example 3 was yielded in the same way as in Example 2 except the use of the mixed powdery particles produced in Example 1 (70.0% by mass of the low-temperature-sintering material (B material) and 30.0% by mass of the cordierite material (A material)). Moreover, a dielectric ceramic of Example 4 was yielded in the same way as in Example 2 except the use of mixed powdery particles (67.5% by mass of the low-temperature-sintering material (B material) and 32.5% by mass of the cordierite material (A material)).

Comparative Examples 3, 4, 5 and 6

A method for producing a dielectric ceramic of each of Comparative Examples 3 to 6 is as shown in a flowchart in FIG. 9. Specifically, in the same way as in Comparative Example 1, a low-temperature-sintering material (B material) was produced. Subsequently, a pulverizing and a drying step were added to the process before the B material was mixed with the cordierite material (A material). In Comparative Example 5, the value in the unit of "% by mass" of each of the low-temperature-sintering material (B material) and the cordierite material (A material) was equal to that in Comparative Example 1; in Comparative Example 3, the value of the B material and that of the A material were set to 65.0% by mass and 35.0% by mass, respectively; in Comparative Example 4, the value of the B material and that of the A material were set to 62.5% by mass and 37.5% by mass, respectively; and in Comparative Example 6, the value of the B material and that of the A material were set to 67.5% by mass and 32.5% by mass, respectively. In each of the examples, in the same was as in Comparative Example 1, mixed powdery particles were produced, and a slurry of the resultant mixed powdery particles was shaped into ceramic green sheets in the same way as in Example 2, and some of the sheets was fired at 900° C. to produce a dielectric ceramic.

In Table 4 are shown the BET specific surface area of the mixed powdery particles yielded in each of Examples 2 to 4 and Comparative Examples 3 to 6, which were made of the low-temperature-sintering material (B material) and the cordierite material (A material); and are shown the density, the porosity and the dielectric constant, at 15 GHz, of the dielectric ceramic yielded therein. In Table 5 is shown the composition proportion of the (fired) dielectric ceramic yielded therein in terms of the composition of the raw materials.

Figure 6:
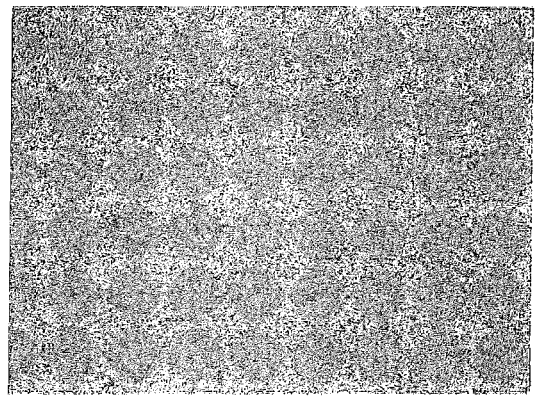
FIG. 6 is a microscopic photograph of a dielectric ceramic according to Example 3 of the invention.
Figure 7:
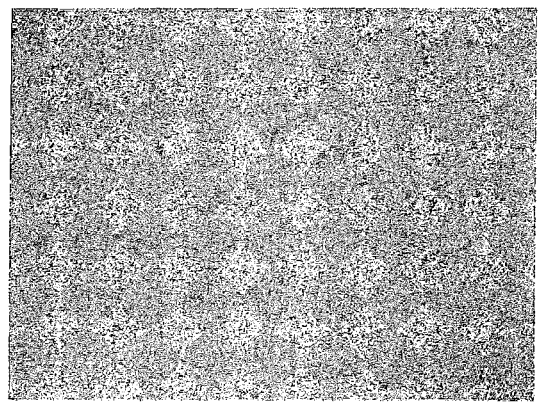
FIG. 7 is a microscopic photograph of a dielectric ceramic according to Comparative Example 5 of the invention.

Furthermore, a cross section of the dielectric ceramic was mirror-polished, and the cross section was observed through an optical microscope. FIGS. 6 and 7 show optical microscopic photograms (with a magnification of 100). FIG. 6 is a cross-section-observed photograph of the dielectric ceramic of Example 3, and FIG. 7 is a cross-section-observed photograph of the dielectric ceramic of Comparative Example 5. On the basis of the cross-section-observed photographs, the porosity of these dielectric ceramics was calculated out. Also about the dielectric ceramics of the other working examples and comparative examples, in the same way, the porosity was calculated out. The results are shown in Table 4.

TABLE 4

|  | Producing process | B material: low-temperature-sintering material (% by mass) | A material: cordierite material (% by mass) | Specific surface area of mixed powdery particles ($m^2/g$) | Density ($\times 10^3$ $kg/m^3$) | Porosity (%) | Dielectric constant |
| --- | --- | --- | --- | --- | --- | --- | --- |
| Example 2 | FIG. 1 | 72.5 | 27.5 | 13.6 | 2.80 | 0.68 | 6.20 |
| Example 3 | FIG. 1 | 70.0 | 30.0 | 14.6 | 2.78 | 0.48 | 6.14 |
| Example 4 | FIG. 1 | 67.5 | 32.5 | 15.0 | 2.76 | 0.69 | 6.05 |
| Comparative Example 3 | FIG. 9 | 65.0 | 35.0 | 10.9 | 2.54 | 2.06 | 5.47 |
| Comparative Example 4 | FIG. 9 | 62.5 | 37.5 | 10.4 | 2.30 | 5.27 | 4.80 |
| Comparative Example 5 | FIG. 9 | 70.0 | 30.0 | 10.8 | 2.71 | 1.41 | 5.94 |
| Comparative Example 6 | FIG. 9 | 67.5 | 32.5 | 11.9 | 2.66 | 0.90 | 5.80 |

TABLE 5

|  | MgO (parts by mass) | Al$_2$O$_3$ (parts by mass) | SiO$_2$ (parts by mass) | SrCO$_3$ (parts by mass) | Bi$_2$O$_3$ (parts by mass) | Na$_2$CO$_3$ (parts by mass) | K$_2$CO$_3$ (part by mass) | CuO (part by mass) | Mn$_3$O$_4$ (part by mass) |
|---|---|---|---|---|---|---|---|---|---|
| Example 2 | 3.8 | 20.3 | 52.6 | 15.3 | 2.7 | 3.7 | 0.8 | 0.3 | 0.5 |
| Example 3 | 4.1 | 20.8 | 52.6 | 14.8 | 2.6 | 3.5 | 0.8 | 0.3 | 0.5 |
| Example 4 | 4.5 | 21.3 | 52.6 | 14.2 | 2.5 | 3.4 | 0.7 | 0.3 | 0.5 |
| Comparative Example 3 | 4.8 | 22.7 | 55.8 | 10.6 | 2.6 | 2.1 | 0.6 | 0.3 | 0.5 |
| Comparative Example 4 | 5.5 | 23.7 | 55.5 | 9.7 | 2.4 | 1.9 | 0.5 | 0.3 | 0.5 |
| Comparative Example 5 | 4.1 | 20.8 | 52.6 | 14.8 | 2.6 | 3.5 | 0.8 | 0.3 | 0.5 |
| Comparative Example 6 | 4.5 | 21.3 | 52.6 | 14.2 | 2.5 | 3.4 | 0.7 | 0.3 | 0.5 |

When check was made through the optical microscopic photograms shown in FIGS. 6 and 7, it was verifiable that the dielectric ceramic of the working example was evidently smaller in area of pore moieties (blackish moieties) than that of the comparative example. The porosities in the working examples were each smaller than those in the comparative examples to be 0.8% or less.

Example 5

Until a ceramic green sheet was shaped, the same steps as in Example 2 were performed (FIG. 1). After the shaping of the ceramic green sheet, in accordance with the producing process in FIG. 2, a ceramic substrate was produced as described below.

As illustrated in FIG. 2(a), a ceramic green sheet 300a was caused to be supported onto a resin film 500 made of PET. In this state, via holes 400a were made in the ceramic green sheet 300a. The via holes 400a were made to each have a diameter of 50 µm by laser working.

Next, the ceramic green sheet 300a and a screen mask were set to a printer. As illustrated in FIGS. 2(b) and 2(c), a squeegee was used to print and fill a conductor paste 402a into the via holes 400a made in the ceramic green sheet 300a, and further wiring lines 403a and others were printed and formed thereon. The used conductor paste 402a was a Ag paste.

Next, as illustrated in FIGS. 2(d) and 2(e), the resin film 500 was peeled from the ceramic green sheet 300a, and then this ceramic green sheet and the same ceramic green sheets were put onto each other (into the form of 10 layers put on each other). One sheet 300b of the ceramic green sheets was fixed to a press machine through an adhesive sheet, and the ceramic green sheets 300a and 300b were located to put their via wiring moieties 401a and 401b onto each other. A pressure was applied thereto along the vertical direction to laminate the layers onto each other. While a pressure of 15 MPa was applied to the resultant laminate, the laminate was kept at 85° C., at which the binder was to be softened, for 30 minutes, and the ceramic green sheets 300b and 300b were compressed by cold isostatic pressing (CIP) to produce a shaped body (thickness: 1.5 mm).

Thereafter, the shaped body was fired to produce a ceramic substrate. This firing was performed by degreasing the shaped body at 600° C. and subsequently keeping the shaped body at 875° C. in the atmospheric air for about 2 hours. In the same manner as in Example 1, the dielectric ceramic of the resultant ceramic substrate was a ceramic substrate which included Sr anorthite, cordierite, Al$_2$O$_3$, SiO$_2$ and others, had ceramic layers laminated into a multilayered form and each made of the dielectric ceramic, and had therein the formed wiring lines and others.

Example 6

Figure 16A:
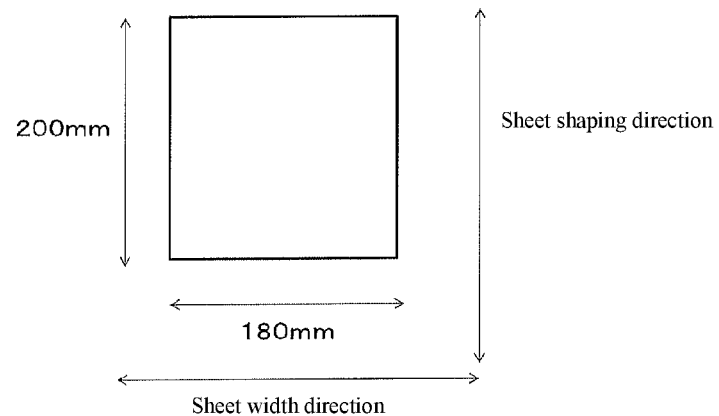
FIGS. 16(a) through 16(c) are schematic top views referred to for describing steps in a method for measuring the shrinkage factor, and a variation in the shrinkage factor.

The slurry (D50=0.36 µm) yielded in Example 1, the concentration in which was 37% by mass, was taken out. To 100 parts by mass of the slurry were added 7 parts by mass of a plasticizer (DOP), and then thereto were added 10 parts by mass of a binder (PVB). The materials were stirred and dispersed. Furthermore, the resultant was vacuum-degassed to be defoamed. In this way, entrained air, the organic solvent and other volatile components were evaporated to make the resultant into a slurry suitable for being shaped. A doctor blade method was used to shape, onto a resin film made of PET, the defoamed slurry into a ceramic green sheet having a shaping thickness of 150 µm at a shaping speed of 0.20 m/min. The shaped body was then cut into sheets each having a size of 180 mm×200 mm (FIG. 16(a)).

Each of the resultant ceramic green sheets was peeled from the resin sheet. Eight sheets of these sheets were put onto each other, and temporarily compressed by a press machine to produce a laminate. Thereafter, while a pressure of 17 MPa was applied to the laminate, the laminate was kept at 85° C., at which the binder was to be softened, for 30 minutes, and the laminate was subjected to cold isostatic pressing (CIP) to produce a substrate.

Figure 16B:
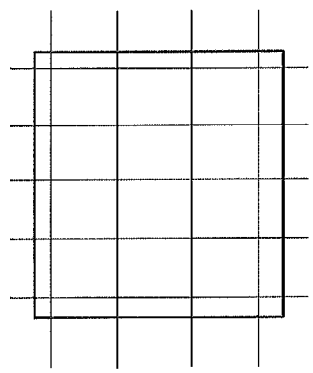
Figure 16C:
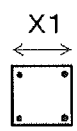

This substrate was cut into a 45-mm square to produce a cut substrate (FIG. 16(b)). Punching pins were used to give (four) marks to (four corners of) the substrate. Thereabout, the between-marking distance (X1) before the firing was defined (FIG. 16(c)).

Thereafter, the shaped body was fired in a firing furnace in the atmospheric air to produce a dielectric ceramic. In this firing, up to 600° C., the temperature was raised at a rate of about 20° C. per hour (degreasing step). From 600° C., the temperature was raised at a rate of about 200° C. per hour, and then the substrate was kept at 900° C. for 2 hours to be fired. Thereabout, the between-marking distance (X2) after the firing was defined.

Example 7

A substrate was produced in the same way as in Example 6 except that in Example 6, a mixed slurry was produced as described below. The shrinkage factor thereof at the firing time, and a variation in the factor were evaluated.
(Pulverization of Cordierite Material (A Material))

A commercially available cordierite material (composition: 2MgO.2Al$_2$O$_3$.5SiO$_2$; purity: 97.5%; median diameter D50: 1.65 µm; particle diameter D95: 4.5 µm; BET: 6.3 m²/g) was charged together with organic solvents ethanol and butanol into a ball mill of 100 L volume in which zirconia balls of 5 mm diameter were put, and the concentration in the slurry was adjusted into 37% by mass. These components were wet-pulverized and mixed with each other for 9 hours (6 kg/lot). The pulverization was performed to set the particle diameter D95 to 1.5 μm. The particle size distribution of the pulverized particles is shown in FIG. 11(b). An SEM photograph of the pulverized particles is shown in FIG. 12(b). From FIGS. 11 and 12, it was verifiable that Example 7 had a sharper particle size distribution than Example 6 described above to include no coarse particles (FIGS. 11(a) and 12(a)).

Thereafter, the B material (low-temperature-sintering material) yielded in Example 1 were charged together with organic solvents ethanol and butanol into the ball mill of 100 L volume, in which zirconia balls of 5 mm diameter were put and the pulverized cordierite material was put. The addition of the B material was made in such a manner that about the blend ratio, the proportion of the B material (low-temperature-sintering material) and that of the cordierite material (A material) were set to 70% by mass and 30% by mass, respectively. The concentration in the slurry was adjusted to 47% by mass, and these components were wet-pulverized and mixed with each other for 22 hours to produce a mixed slurry (20 kg/lot).

Comparative Example 7

A substrate was produced in the same way as in Example 6 except that in Example 6, mixed powdery particles (in a slurry state before dried) were produced as performed in Comparative Example 1. The shrinkage factor thereof at the firing time, and a variation in the factor were evaluated.

Comparative Example 8

A substrate was produced in the same way as in Example 6 except that in Example 6, as the mixed powdery particles, powder made only of the B material (in a slurry state before dried) was used as in Comparative Example 2. The shrinkage factor thereof at the firing time, and a variation in the factor were evaluated.

Figure 13A:
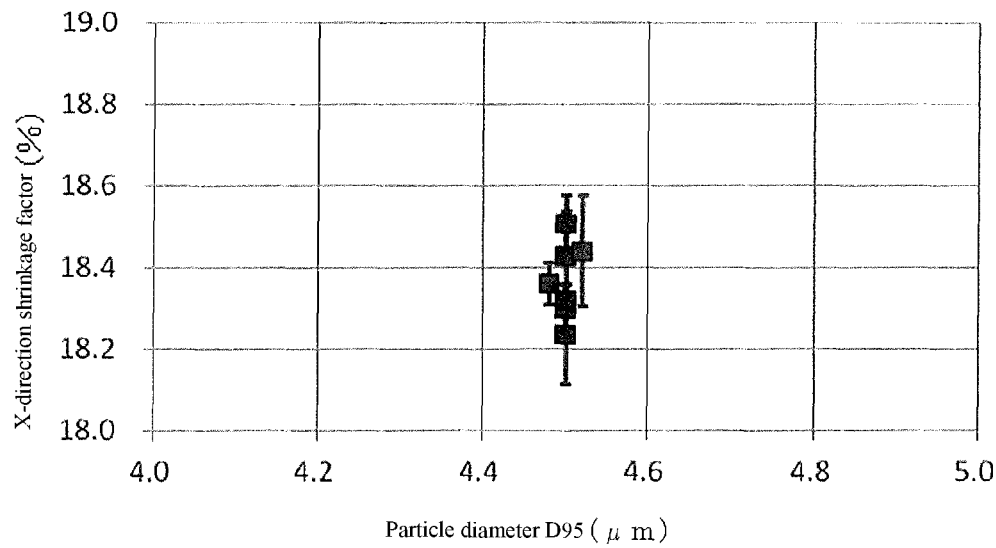
FIGS. 13(a) and 13(b) are charts that show, respectively, a variation in the shrinkage factor of a ceramic in Example 6 of the invention versus the particle diameter D95 of particles therein, and a variation in that in Example 7 thereof versus the particle diameter D95 of particles therein.
Figure 13B:
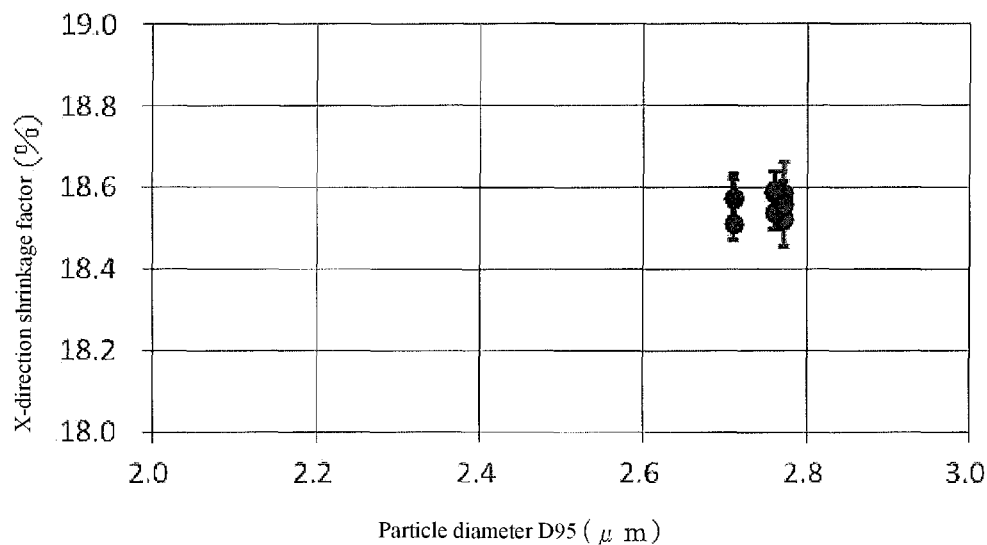

Evaluations were made about a variation in substrate shrinkage factor before and after the firing, the variation being based on advance pulverization of the cordierite material (A material). Results of the evaluations are shown in FIGS. 11 to 13. FIG. 11 are a graph showing the particle size distribution of the cordierite material (A material) in (a) Example 6 of the present invention, and a graph showing that in (b) Example 7 thereof. FIG. 12 are a photograph showing an SEM image of the cordierite material (A material) in (a) Example 6 of the invention, and a photograph showing one in (b) Example 7 thereof. FIG. 13 are a graph showing a variation in the shrinkage factor versus the particle diameter D95 in (a) Example 6 of the invention, and a graph showing one in (b) Example 7 thereof. Before and after the firing, the variation in the shrinkage factor of each of the substrates was calculated out from the shrinkage factors obtained by the above-mentioned method. The variation (standard deviation 36) in the respective shrinkage factors of 15 samples (n=15) was ±0.30% in Example 6, ±0.15% in Example 7, ±0.60% in Comparative Example 7, and ±0.60% in Comparative Example 8. In FIGS. 13(a) and 13(b), any plot corresponds to the average of respective values obtained by measuring the 15 samples. The variation (standard deviation 36) in each of the plots is represented by an error bar.

Figure 11A:
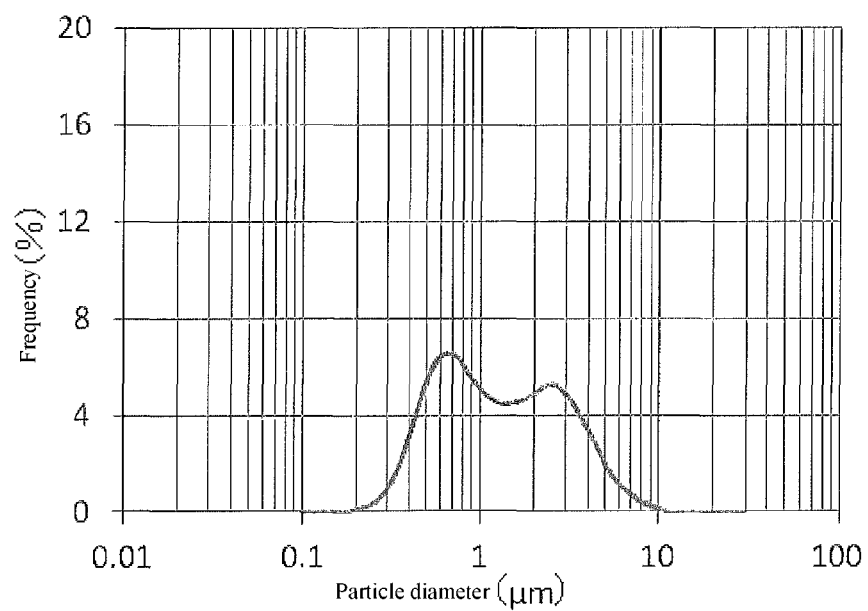
FIGS. 11(a) and 11(b) are charts that show, respectively, the particle size distribution of a cordierite material (A material) in Example 6 of the invention, and that in Example 7 thereof.
Figure 11B:
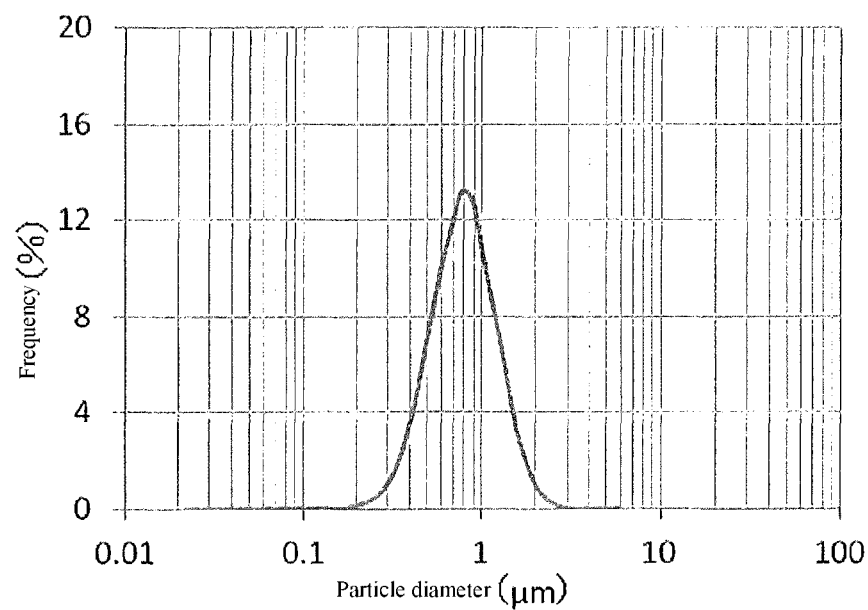

When the commercially available product was used as it was without being beforehand pulverized as in Example 6, the particle diameter D95 was 4.5 μm as shown in FIG. 11(a), and the particle size distribution was also wide and was not sharp. As illustrated in FIG. 12(a), it was observable that the A material contained finely pulverized particles, but partially contained coarse particles. Accordingly, in Example 6, at the firing time, the denseness of the microstructure was attained to the same degree as in the other working examples; however, as illustrated in FIG. 13(a), before and after the firing, the variation in the shrinkage factor of the substrate gave a standard deviation 36 of ±0.30% to be relatively large.

When the A material was beforehand pulverized as in Example 7, as illustrated in FIG. 11(b) the particle diameter D95 was 1.5 μm. Furthermore, the gained particle size distribution was very sharp. As illustrated in FIG. 12(b), it was observable that the A material was wholly pulverized into fine particles and no coarse particles were present. As illustrated in FIG. 13(b), therefore, in Example 7, before and after the firing, the variation in the shrinkage factor of the substrate gave a standard deviation 36 of ±0.15%. Thus, it was understood that although Example 7 was substantially equal in shrinkage factor to Example 6, Example 7 succeeded in being made far lower in variation in the shrinkage factor than Example 6. In conclusion, the following was understood: by pulverizing the A material in advance before the A and B materials are mixed and pulverized, the particle diameter D95 of the A material can be decreased and the presence of coarse particles can be decreased, so that at the firing time, the microstructure can be uniformly made dense; and before and after the firing, the variation in the shrinkage factor of the ceramic substrate (for example, the variation therein between individual sites inside a lot, or between lots) can be decreased from ±0.30% to ±0.15%. By contrast, in each of Comparative Examples 7 and 8, before and after the firing, the variation in the shrinkage factor of the substrate was in the range of ±0.60% of the average, so as to be very large although this situation is not illustrated. Thus, the comparative examples did not gain desired advantages.

Example 8

The slurry yielded in Example 7, the concentration in which was 47% by mass, was taken out. To 100 parts by mass of the slurry were added 7 parts by mass of a plasticizer (DOP), and then thereto were added 10 parts by mass of a binder (PVB). These materials were stirred and dispersed. Furthermore, the resultant was vacuum-degassed to be defoamed. In this way, entrained air, the organic solvent and other volatile components were evaporated to make the resultant into a slurry suitable for being shaped. A doctor blade method was used to shape the defoamed slurry into a ceramic green sheet having a shaping thickness of 150 μm at a shaping speed of 0.20 m/min. The shaped body was cut into sheets each having a size of 180 mm×200 mm.
(1) Some sheets of the cut ceramic green sheets were each peeled off from the PET resin film to yield Ag-paste-layer-free ceramic green sheets.
(2) Separately, in order to produce a Ag electrode layer, a squeegee was used in a printer to print a Ag paste patternwisely into a thickness of 10 μm onto each of some of the above-mentioned cut ceramic green sheets. In this way, Ag-paste-layer-attached ceramic green sheets were produced. The resultant Ag-paste-layer-attached ceramic green sheets were each peeled from the PET resin film. In this way, the Ag-paste-layer-attached ceramic green sheets were yielded without having any other member.

Figure 14A:
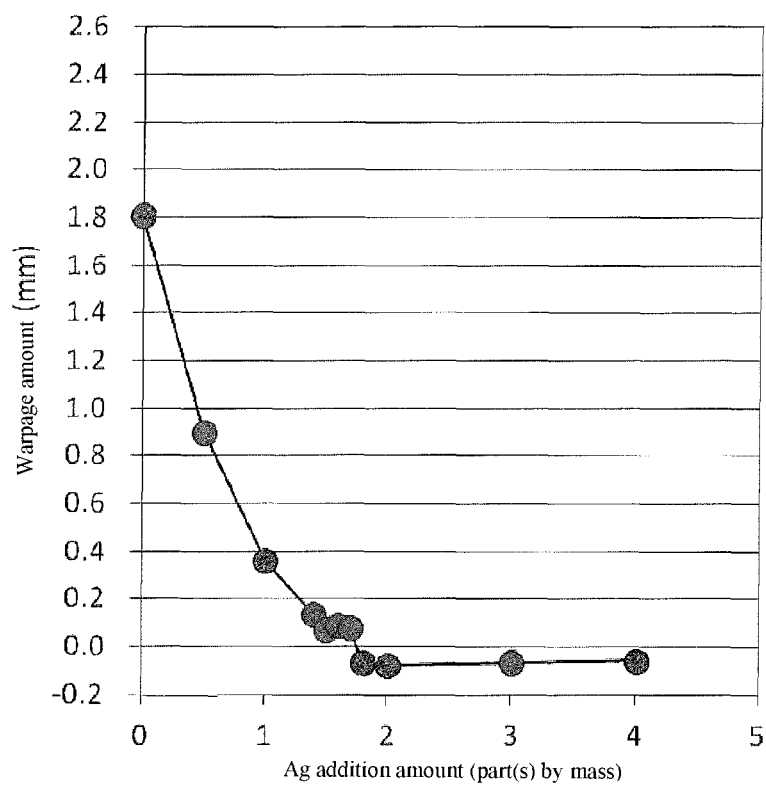
FIG. 14(a) is a graph showing, in Example 8 of the invention, the warpage amount of a ceramic versus the Ag content therein.
Figure 14B:
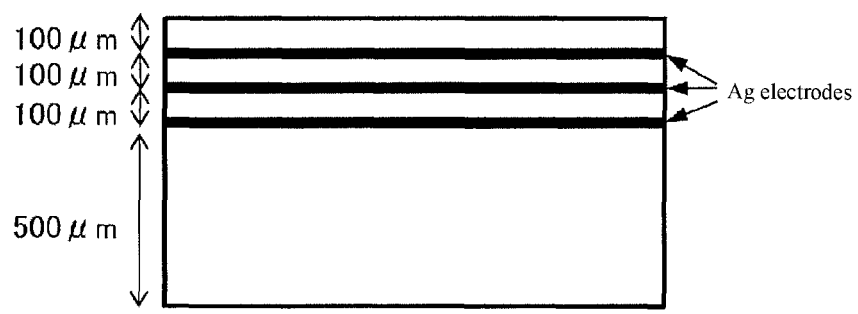
FIG. 14(b) is a sectional view illustrating a layer structure in Example 8.

In order to produce a layer structure as illustrated in FIG. 14(b), eight of the layers in each of the items (1) and (2) were put onto each other, and the resultant was temporarily compressed by a press machine to produce a laminate. Specifically, a layer structure was produced in which in order from the bottom thereof, the following were laminated onto each other: four of the Ag-paste-layer-free ceramic green sheets (1); three of the Ag-paste-layer-attached ceramic green sheets (2); and one of the Ag-paste-layer-free ceramic green sheets (1). Thereafter, while a pressure of 17 MPa was applied to the laminate, the laminate was kept at 85° C., at which the binder was to be softened, for 30 minutes, and subjected to cold isostatic pressing (CIP) to yield a substrate.

Thereafter, the substrate was fired in a firing furnace in the atmospheric air to produce a Ag-electrode-layer-attached substrate. In this firing, up to 600° C., the temperature was raised at a rate of about 20° C. per hour (degreasing step). From 600° C., the temperature was raised at a rate of about 200° C. per hour, and then the substrate was kept at 900° C. for 2 hours to be fired.

Example 9

A Ag-electrode-layer-attached substrate was produced in the same way as in Example 8 except that in Example 8, the addition of Ag was made as described below, and then the warpage amount and others of the substrate were evaluated.
(Addition of Ag)

As illustrated in FIG. 10, in the step of mixing and pulverizing the A material and the B material in Example 7, at the time of the addition of the B material, the addition of Ag was also made, and the mixing and pulverization were performed. About the addition quantity of Ag, one part by mass of Ag was added to 99 parts by mass of the mixed powdery particles to set the total quantity of the mixed powdery particles and Ag to 100% by mass.

Examples 10 to 17

In each of the examples, a Ag-electrode-layer-attached substrate was produced in the same way as in Example 9 except that in Example 9, a Ag addition amount as shown in Table 6 was used, and the warpage amount and others thereof were evaluated. The total of the mixed powdery particle and Ag addition amounts was set to 100% by mass.

TABLE 6

| | Ag addition amount (% by mass) | Warpage amount (mm) | Density (×10³ kg/m³) | Dielectric constant | fQ product (THz) |
|---|---|---|---|---|---|
| Example 8 | 0 | 1.811 | 2.78 | 6.17 | 12.3 |
| Example 9 | 1 | 0.360 | — | — | — |
| Example 10 | 1.4 | 0.137 | — | — | — |
| Example 11 | 1.5 | 0.075 | — | — | — |
| Example 12 | 1.6 | 0.091 | — | — | — |
| Example 13 | 1.7 | 0.079 | — | — | — |
| Example 14 | 1.8 | −0.063 | — | — | — |
| Example 15 | 2 | −0.080 | 2.83 | 6.34 | 12.5 |
| Example 16 | 3 | −0.067 | — | — | — |
| Example 17 | 4 | −0.057 | — | — | — |

In Table 6 are shown evaluation results of Examples 8 to 17. As shown in Table 6, in the case of the addition of no Ag as in Example 8, evaluation results of desired dielectric characteristics were obtained but the warpage amount of the substrate was increased at the firing time. The reason therefor is presumed as follows: when no Ag component was contained in the mixed powdery particles in spite of the use of Ag as the electrode metal used for the wiring lines, Ag in the electrode diffused easily into the glass component in the ceramic green sheets at the firing time, so that the denseness locally became uneven and the shrinkage factor became uneven; thus, the ceramic substrate was warped. In the meantime, the addition of Ag into the mixed powdery particles as in Example 9 to 17 enabled to decrease the warpage amount of the substrate at the firing time. The reason therefor is presumed as follows: as described above, in the mixed-powdery-particle preparing step, the incorporation of Ag restrained Ag from diffusing into the glass component. When the Ag addition amount was, particularly, more than 1% by mass and 4% or less by mass, the warpage amount of the substrate was remarkably decreasable. Ag is a metallic material; therefore, the dielectric ceramic was raised in dielectric constant; however, as shown in Table 6, when the Ag addition amount thereinto was about 2% by mass, the dielectric ceramic attained a dielectric constant of 6.5 or less, which is a target value in the present invention. Moreover, when the Ag addition amount was about 2% by mass, the dielectric ceramic also attained an fQ product at substantially the same level as when the Ag amount was zero.

DESCRIPTION OF REFERENCE SIGNS 300a and b: Ceramic green sheets
400a an b: Via holes
401a and b: Via wiring moieties
402a and b: Conductor pastes
403a and b: Wiring lines
500: Resin film

The invention claimed is:
1. A method for producing a dielectric ceramic, comprising: shaping mixed powdery particles comprising a cordierite material ($2MgO \cdot 2Al_2O_3 \cdot 5SiO_2$) and a low-temperature-sintering material comprising Al, Si and Sr, the Si being partially vitrified; and firing the resultant shaped body;
wherein the method comprises the step of wet-pulverizing the low-temperature-sintering material together with at least the cordierite material to prepare mixed powder particles having a median diameter D50 less than 1 μm;
wherein, in a process until a time of the preparation of the mixed powder particles, the low-temperature-sintering material undergoes no step of wet-pulverizing only the low-temperature-sintering material and drying the resultant pulverized material; and
wherein the resultant dielectric ceramic comprises, as a main phase thereof, Sr anorthite ($SrAl_2Si_2O_8$) and further comprises cordierite and alumina ($Al_2O_3$); and has a dielectric constant of 6.5 or less at a frequency of 15 GHz and a porosity of 0.8% or less.

2. The method for producing a dielectric ceramic according to claim 1, comprising the step of calcining raw materials to 850° C. or lower to yield the low-temperature-sintering material.

3. The method for producing a dielectric ceramic according to claim 1, wherein the firing is performed at 1000° C. or lower.

4. The method for producing a dielectric ceramic according to claim 1, wherein a slurry of the mixed powder particles yielded by the wet-pulverization, the slurry comprising an organic solvent, is sheet-shaped into ceramic green sheets; and the ceramic green sheets are laminated onto each other to yield the shaped body.

5. The method for producing a dielectric ceramic according to claim 1, wherein the resultant dielectric ceramic is a ceramic substrate.

6. The method for producing a dielectric ceramic according to claim 1, wherein before the step of preparing the mixed powder particles, the cordierite material is pulverized to have a particle diameter D95 of 0.5 to 3.0 µm.

7. The method for producing a dielectric ceramic according to claim 1, wherein in the step of preparing the mixed powder particles, the mixed powder particles comprise Ag.

* * * * *